United States Patent
Zhou et al.

(10) Patent No.: US 11,851,521 B2
(45) Date of Patent: Dec. 26, 2023

(54) POLYURETHANE FOAM AND METHODS OF FORMING THE SAME

(71) Applicant: SAINT-GOBAIN PERFORMANCE PLASTICS CORPORATION, Solon, OH (US)

(72) Inventors: Jing Zhou, Shanghai (CN); Yue Dong, Shanghai (CN); Song Yu, Shanghai (CN)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 279 days.

(21) Appl. No.: 17/269,415

(22) PCT Filed: Aug. 21, 2019

(86) PCT No.: PCT/US2019/047383
§ 371 (c)(1),
(2) Date: Feb. 18, 2021

(87) PCT Pub. No.: WO2020/041397
PCT Pub. Date: Feb. 27, 2020

(65) Prior Publication Data
US 2021/0253777 A1    Aug. 19, 2021

Related U.S. Application Data

(60) Provisional application No. 62/727,618, filed on Sep. 6, 2018.

(30) Foreign Application Priority Data

Aug. 23, 2018   (CN) .......................... 201810971318.2

(51) Int. Cl.
| C08K 3/016 | (2018.01) |
| C08G 18/50 | (2006.01) |
| C08G 18/38 | (2006.01) |
| C08G 18/76 | (2006.01) |
| C08J 9/00  | (2006.01) |
| C08K 3/04  | (2006.01) |

(52) U.S. Cl.
CPC ..... C08G 18/5075 (2013.01); C08G 18/3853 (2013.01); C08G 18/5078 (2013.01); C08G 18/5081 (2013.01); C08G 18/7671 (2013.01); C08J 9/0066 (2013.01); C08K 3/016 (2018.01); C08K 3/04 (2013.01); C08G 2110/0066 (2021.01)

(58) Field of Classification Search
CPC ............ C08G 18/5075; C08G 18/3853; C08G 18/7671; C08G 18/5078; C08G 18/5081; C08G 2110/006; C08K 3/04; C09J 9/0066

See application file for complete search history.

(56) References Cited

U.S. PATENT DOCUMENTS

| 4,859,713 A *   | 8/1989  | Blount ................ C08K 5/49 |
|                 |         |                           521/107 |
| 5,173,515 A     | 12/1992 | Von Bonin et al. |
| 5,719,199 A     | 2/1998  | Wallace et al. |
| 8,889,754 B2    | 11/2014 | Rodrigo et al. |
| 2002/0020827 A1 | 2/2002  | Munzenberger et al. |
| 2003/0130365 A1 | 7/2003  | Eling et al. |
| 2007/0293596 A1 | 12/2007 | Reim et al. |
| 2009/0136440 A1 | 5/2009  | Maas et al. |
| 2012/0022176 A1 | 1/2012  | Stahl et al. |
| 2013/0203936 A1 | 8/2013  | Fujita et al. |
| 2015/0322194 A1 | 11/2015 | Schmidt et al. |
| 2016/0046779 A1 | 2/2016  | Neff et al. |

FOREIGN PATENT DOCUMENTS

| CN | 102066448 A    | 5/2011  |            |
| CN | 103619898 A    | 3/2014  |            |
| CN | 105143299 A    | 12/2015 |            |
| CN | 105218782 A    | 1/2016  |            |
| CN | 105542101 A    | 5/2016  |            |
| CN | 105601864 A    | 5/2016  |            |
| CN | 106589458 A    | 4/2017  |            |
| CN | 107459619 A    | 12/2017 |            |
| CN | 108102348 A    | 6/2018  |            |
| CN | 108341946 A    | 7/2018  |            |
| DE | 10302198 A1    | 7/2004  |            |
| GB | 1279894 A      | 6/1972  |            |
| JP | 2012097169 A   | 5/2012  |            |
| WO | WO-2010030975 A1 * | 3/2010 | ........... C08G 18/715 |
| WO | 2013/064671 A1 | 5/2013  |            |
| WO | 2014/149711 A1 | 9/2014  |            |
| WO | WO-2016069356 A1 * | 5/2016 | ............... B05D 1/02 |

(Continued)

OTHER PUBLICATIONS

Extended European Search Report for EP Application No. EP19852777. 2, dated May 10, 2022, 12 pages.

(Continued)

*Primary Examiner* — Michael L Leonard
(74) *Attorney, Agent, or Firm* — Abel Schillinger, LLP; Chi Suk Kim

(57) ABSTRACT

A polyurethane foam may include a base polyol component, a phosphorous polyol component, an expandable graphite, and melamine. The polyurethane foam may have a V0 rating based on a UL94 flame retardancy test performed at a polyurethane foam thickness of 3.5 mm and a polyurethane foam density of 380 kg/m³.

13 Claims, 1 Drawing Sheet

(56) References Cited

FOREIGN PATENT DOCUMENTS

WO      2020/041397 A1      2/2020
WO       2010030975 A1      3/2020

OTHER PUBLICATIONS

Wu Yuqiang, "Synthesis of reactive phosphorous flame retardant and its application in rigid polyurethane foam," Apr. 15, 2017, pp. B016-27, Chinese Doctoral Dissertations & Master's Theses Full-text Database (Master) Engineering Science and Technology, Issue 4 (with Abstract).

Zhang Wangqiang, "Preparation of polyurethane flame retardant rigid foam by reactive phosphorus hydrogen composite flame retardant polyol and its properties," Dec. 31, 2015, pp. 145-150, Polymer Materials Science and Engineering, Issue 09 (with Abstract).

Singh, Harpal et al., "Ignition, Combustion, Toxicity, and Fire Retardancy of Polyurethane Foams: A Comprehensive Review," Journal of Applied Polymer Science, vol. 111, pp. 1115-1143, published Oct. 17, 2008.

International Search Report and Written Opinion for PCT Application No. PCT/US2016/047373, dated Dec. 6, 2019, 12 pages.

\* cited by examiner

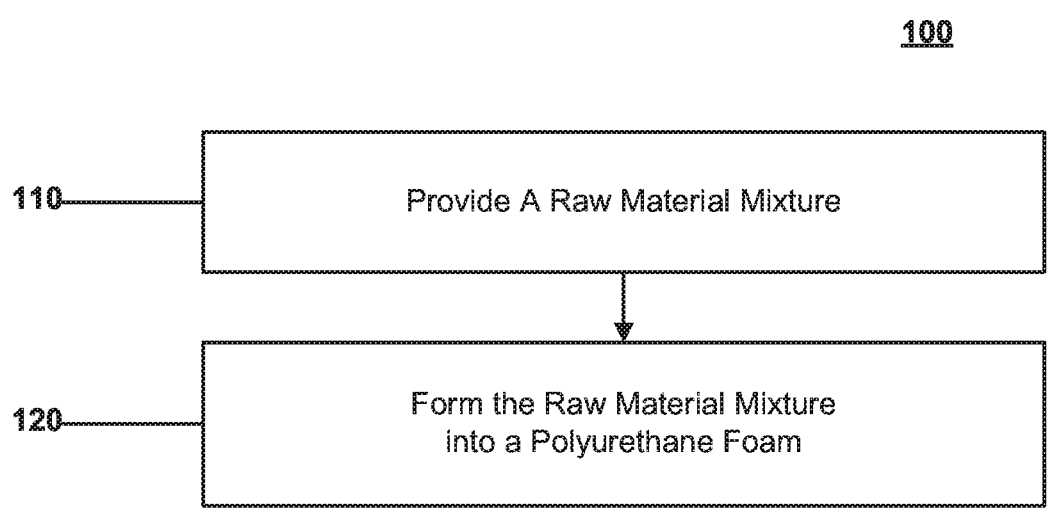

POLYURETHANE FOAM AND METHODS OF FORMING THE SAME

CROSS-REFERENCE TO RELATED APPLICATIONS

This application is a National Stage entry under 35 U.S.C. § 371 of International Application No. PCT/US2019/047383, filed Aug. 21, 2019, entitled "POLYURETHANE FOAM AND METHODS OF FORMING THE SAME" by Jing ZHOU et al., which claims priority to U.S. Provisional Patent Application No. 62/727,618, filed Sep. 6, 2018, entitled "POLYURETHANE FOAM AND METHODS OF FORMING THE SAME," by Jing ZHOU et al., and claims priority to Chinese Patent Application No. CN201810971318.2, filed Aug. 23, 2018, entitled "POLYURETHANE FOAM AND METHODS OF FORMING THE SAME," by Jing ZHOU et al all of which applications are assigned to the current assignee hereof and incorporated herein by reference in their entireties.

TECHNICAL FIELD

The present disclosure relates to a polyurethane foam and methods of forming the same, more particularly, the present disclosure related to a polyurethane foam having a superior flame retardancy rating and methods of forming the same.

BACKGROUND ART

Polyurethane foams are widely used in applications of construction, transportation, and electronics. However, such polyurethanes foams often include specific characteristics that make them prone specific safety issues. For example, such polyurethane foams are generally prone to rapid fire growth due to their inherent chemical properties (i.e., the "—NH—COO—groups" of the polyurethane foam cause lower decomposition temperature than many other polymers) and physical properties (i.e., low density of the polyurethane causes severe dripping during combustion and porous structure promotes oxygen and heat transfer). Accordingly, polyurethane foams formulations with improved safety characteristics are desired.

SUMMARY

According to a first aspect, a polyurethane foam may include a base polyol component, a phosphorous polyol component, and an expandable graphite. The polyurethane foam may have a V0 rating based on a UL94 flame retardancy test performed at a polyurethane foam thickness of 3.5 mm and a polyurethane foam density of 380 $kg/m^3$.

According to yet another aspect, a method of forming a polyurethane foam may include providing a raw material mixture and forming the raw material mixture into a polyurethane foam. The raw material mixture may include a raw base polyol component, a raw phosphorous polyol component, and a raw expandable graphite component. The polyurethane foam may have a V0 rating based on a UL94 flame retardancy test performed at a polyurethane foam thickness of 3.5 mm and a polyurethane foam density of 380 $kg/m^3$.

According to still another aspect, a battery compression pad may include a polyurethane foam. The polyurethane foam may include a base polyol component, a phosphorous polyol component, and an expandable graphite. The polyurethane foam may have a V0 rating based on a UL94 flame retardancy test performed at a polyurethane foam thickness of 3.5 mm and a polyurethane foam density of 380 $kg/m^3$.

BRIEF DESCRIPTION OF THE DRAWINGS

Embodiments are illustrated by way of example and are not limited to the accompanying FIGURES.

FIG. 1 includes a diagram showing a polyurethane foam forming method 100 according to embodiments described herein.

Skilled artisans appreciate that elements in the figures are illustrated for simplicity and clarity and have not necessarily been drawn to scale.

DETAILED DESCRIPTION OF THE PREFERRED EMBODIMENT(S)

The following discussion will focus on specific implementations and embodiments of the teachings. The detailed description is provided to assist in describing certain embodiments and should not be interpreted as a limitation on the scope or applicability of the disclosure or teachings. It will be appreciated that other embodiments can be used based on the disclosure and teachings as provided herein.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Embodiments described herein are generally directed to a polyurethane foam and methods of forming the same, and more particularly, to a polyurethane foam having a superior flame retardancy rating and methods of forming the same.

For purposes of illustration, FIG. 1 includes a diagram showing a polyurethane foam forming method 100 according to particular embodiments described herein. The polyurethane foaming method 100 may include a first step 110 of providing a raw material mixture and a second step 120 of forming the raw material mixture into a polyurethane foam.

Referring to the first step 110, according to certain embodiments, the raw material mixture may include a raw base polyol component, a raw phosphorous polyol component, and a raw expandable graphite component.

According to certain embodiments, the raw material mixture may include a particular content of raw base polyol component. For example, the raw material mixture may include a content of the raw base polyol component of at least about 20 wt. % for a total weight of the raw material mixture, such as, at least about 22 wt. % or at least about 24 wt. % or at least about 26 wt. % or at least about 28 wt. % or at least about 30 wt. % or at least about 32 wt. % or at least about 34 wt. % or at least about 36 wt. % or at least about 38 wt. % or even at least about 40 wt. %. According to yet other embodiments, the raw material mixture may include a content of the raw base polyol component of not greater than about 60 wt. % for a total weight of the raw material mixture, such as, not greater than about 58 wt. % or not greater than about 56 wt. % or not greater than about 54 wt. % or not greater than about 52 wt. % or not greater than about 50 wt. % or not greater than about 48 wt. % or not greater than about 46 wt. % or not greater than about 44 wt. % or not greater than about 42 wt. % or not greater than about 40 wt. % or not greater than about 38 wt. % or even not greater than about 36 wt. %. It will be appreciated that the content of the raw base polyol component in the raw material mixture may be within a range between any of the minimum and maximum values noted above. It will be further appreciated that the content of the raw base polyol component in the raw material mixture may be any value between any of the minimum and maximum values noted above.

According to still other embodiments, the raw base polyol component may have a particular APH color measurement as measured according to ASTM #D1209. For example, the raw base polyol component may have an APHA color measurement of not greater than about 50.

According to yet other embodiments, the raw base polyol component may have a particular OH number. For example, the raw base polyol component may have an OH number of at least about 52.0 KOH mg/g, such as, at least about 52.1 KOH mg/g or at least about 52.2 KOH mg/g or at least about 52.3 KOH mg/g or at least about 52.4 KOH mg/g or at least about 52.5 KOH mg/g or at least about 52.6 KOH mg/g or at least about 52.7 KOH mg/g or at least about 52.8 KOH mg/g or at least about 52.9 KOH mg/g or at least about 53.0 KOH mg/g or at least about 53.1 KOH mg/g or at least about 53.2 KOH mg/g or at least about 53.3 KOH mg/g or at least about 53.4 KOH mg/g or even at least about 53.5 KOH mg/g. According to still other embodiments, the raw base polyol component may have an OH number of not greater than about 56.0 KOH mg/g, such as, not greater than about 55.9 KOH mg/g or not greater than about 55.8 KOH mg/g or not greater than about 55.7 KOH mg/g or not greater than about 55.6 KOH mg/g or not greater than about 55.4 KOH mg/g or not greater than about 55.3 KOH mg/g or not greater than about 55.2 KOH mg/g or not greater than about 55.1 KOH mg/g or not greater than about 55.0 KOH mg/g or not greater than about 54.9 KOH mg/g or not greater than about 54.8 KOH mg/g or not greater than about 54.7 KOH mg/g or not greater than about 54.6 KOH mg/g or even not greater than about 54.5 KOH mg/g. It will be appreciated that the OH number of the raw base polyol component may be within a range between any of the minimum and maximum values noted above. It will be further appreciated that the OH number of the raw base polyol component may be any value between any of the minimum and maximum values noted above.

According to still other embodiments, the raw base polyol component may have a particular viscosity as measured according to ASTM #D4878. For example, the raw base polyol component may have a viscosity of at least about 450 cps/25° C., such as, at least about 455 cps/25° C. or at least about 460 cps/25° C. or at least about 465 cps/25° C. or at least about 470 cps/25° C. or at least about 475 cps/25° C. or at least about 480 cps/25° C. or at least about 485 cps/25° C. or even at least about 490 cps/25° C. According to still other embodiments, the raw base polyol component may have a viscosity of not greater than about 550 cps/25° C., such as, not greater than about 545 cps/25° C. or not greater than about 540 cps/25° C. or not greater than about 535 cps/25° C. or not greater than about 530 cps/25° C. or not greater than about 525 cps/25° C. or not greater than about 520 cps/25° C. or not greater than about 515 cps/25° C. or even not greater than about 510 cps/25° C. It will be appreciated that the viscosity of the raw base polyol component may be within a range between any of the minimum and maximum values noted above. It will be further appreciated that the viscosity of the raw base polyol component may be any value between any of the minimum and maximum values noted above.

According to yet other embodiments, the raw base polyol component may have a particular acid number. For example, the raw base polyol component may have an acid number of not greater than about 0.1 KOH mg/g.

According to other embodiments, the raw base polyol component may have a particular water content. For example, the raw base polyol component may have a water content of not greater than about 0.5%.

According to yet other embodiments, the raw base polyol component may have a particular pH. For example, the raw base polyol component may have a pH of at least about 5.0, such as, at least about 5.1 or at least about 5.2 or at least about 5.3 or at least about 5.4 or at least about 5.5 or at least about 5.6 or at least about 5.7 or at least about 5.8 or at least about 5.9 or even at least about 6.0. According to still other embodiments, the raw base polyol component may have a pH of not greater than about 8.0, such as, not greater than about 7.9 or not greater than about 7.8 or not greater than about 7.7 or not greater than about 7.6 or not greater than about 7.5 or not greater than about 7.4 or not greater than about 7.3 or not greater than about 7.2 or not greater than about 7.1 or even not greater than about 7.0. It will be appreciated that the pH of the raw base polyol component may be within a range between any of the minimum and maximum values noted above. It will be further appreciated that the pH of the raw base polyol component may be any value between any of the minimum and maximum values noted above.

According to still other embodiments, the raw base polyol component may include polyether polyols, polyester polyols, polymer polyols, bio-based polyols or combinations thereof.

According to certain embodiments, the raw material mixture may include a particular content of the raw phosphorous polyol component. For example, the raw material mixture may include a content of the raw phosphorous polyol component of at least about 8 wt. % for a total weight of the raw material mixture, such as, at least about 9 wt. % or at least about 10 wt. % or at least about 11 wt. % or at least about 12 wt. % or at least about 13 wt. % or even at least about 14 wt. %. According to yet other embodiments, the raw material mixture may include a content of the raw phosphorous polyol component of not greater than about 40 wt. % for a total weight of the raw material mixture, such as, not greater than about 38 wt. % or not greater than about 36 wt. % or not greater than about 34 wt. % or not greater than about 32 wt. % or not greater than about 31 wt. % or not greater than about 31 wt. % or not greater than about 30 wt. % or not greater than about 29 wt. % or not greater than about 28 wt. % or not greater than about 27 wt. % or not greater than about 26 wt. % or not greater than about 25 wt. % or not greater than about 24 wt. % or not greater than about 23 wt. % or not greater than about 22 wt. % or not greater than about 21 wt. % or not greater than about 20 wt. % or not greater than about 19 wt. % or even not greater than about 18 wt. %. It will be appreciated that the content of the raw phosphorous polyol component in the raw material mixture may be within a range between any of the minimum and maximum values noted above. It will be further appreciated that the content of the raw phosphorous polyol component in the raw material mixture may be any value between any of the minimum and maximum values noted above.

According to yet other embodiments, the raw phosphorous polyol component may include a particular number of ethylene oxide (EO) terminals. For example, the raw phosphorous polyol component may include at least one EO terminal, such as, at least about two EO terminals or at least about three EO terminals or at least about four EO terminals.

According to other embodiments, the raw phosphorous polyol component may have a particular OH number. For example, the raw phosphorous polyol component may have an OH number of at least about 80 KOH mg/g, such as, at least about 85 KOH mg/g or at least about 90 KOH mg/g or at least about 95 KOH mg/g or at least about 100 KOH mg/g or at least about 105 KOH mg/g or at least about 110 KOH mg/g or at least about 115 KOH mg/g or at least about 120 KOH mg/g or even at least about 125 KOH mg/g. According to still other embodiments, the raw phosphorous polyol component may have an OH number of not greater than about 180 KOH mg/g, such as, not greater than about 175 KOH mg/g or not greater than about 170 KOH mg/g or not greater than about 165 KOH mg/g or not greater than about 160 KOH mg/g or not greater than about 155 KOH mg/g or not greater than about 150 KOH mg/g or not greater than about 145 KOH mg/g or not greater than about 140 KOH mg/g or even not greater than about 135 KOH mg/g. It will be appreciated that the OH number of the raw phosphorous polyol component may be within a range between any of the minimum and maximum values noted above. It will be further appreciated that the OH number of the raw phosphorous polyol component may be any value between any of the minimum and maximum values noted above.

According to other embodiments, the raw phosphorous polyol component may have a particular viscosity. For example, the raw phosphorous polyol component may have a viscosity of at least about 1 Pa*s, such as, at least about 1.1 Pa*s or at least about 1.2 Pa*s or at least about 1.3 Pa*s or at least about 1.4 Pa*s or at least about 1.5 Pa*s or at least about 1.6 Pa*s or at least about 1.7 Pa*s or at least about 1.8 Pa*s or at least about 1.9 Pa*s or even at least about 2.0 Pa*s. According to yet other embodiments, the raw phosphorous polyol component may have a viscosity of at least about 1 Pa*s, such as, at least about 1.1 Pa*s or at least about 1.2 Pa*s or at least about 1.3 Pa*s or at least about 1.4 Pa*s or at least about 1.5 Pa*s or at least about 1.6 Pa*s or at least about 1.7 Pa*s or at least about 1.8 Pa*s or at least about 1.9 Pa*s or even at least about 2.0 Pa*s. It will be appreciated that the viscosity of the raw phosphorous polyol component may be within a range between any of the minimum and maximum values noted above. It will be further appreciated that the viscosity of the raw phosphorous polyol component may be any value between any of the minimum and maximum values noted above.

According to other embodiments, the raw phosphorous polyol component may have a particular molecular mass. For example, the raw phosphorous polyol component may have a molecular mass of at least about 700, such as, at least about 710 or at least about 720 or at least about 730 or at least about 740 or at least about 750 or at least about 760 or at least about 770 or at least about 780 or at least about 790 or at least about 800 or at least about 810 or at least about 820 or at least about 830 or at least about 840 or at least about 850 or even at least about 860. According to still other embodiments, the raw phosphorous polyol component may have a molecular mass of not greater than about 920, such as, not greater than about 910 or not greater than about 900 or not greater than about 890 or not greater than about 880 or even not greater than about 870. It will be appreciated that the molecular mass of the raw phosphorous polyol component may be within a range between any of the minimum and maximum values noted above. It will be further appreciated that the molecular mass of the raw phosphorous polyol component may be any value between any of the minimum and maximum values noted above.

According to yet other embodiments, the raw phosphorous polyol component may have a particular functionality. For example, the raw phosphorous polyol component may have a functionality of at least 1, such as, at least 2 or at least 3 or at least 4 or at least 5 or at least 6.

According to still other embodiments, the raw phosphorous polyol component may include phosphate types, phosphonate types, phosphinate types, phosphite types, phosphorous compounds having hydroxyl groups or combinations thereof.

According to certain embodiments, the raw material mixture may include a particular content of the raw expandable graphite component. For example, the raw material mixture may include a content of the raw expandable graphite component of at least about 8 wt. % for a total weight of the raw material mixture, such as, at least about 9 wt. % or at least about 10 wt. % or at least about 11 wt. % or at least about 12 wt. % or at least about 13 wt. % or even at least about 14 wt. %. According to yet other embodiments, the raw material mixture may include a content of the raw expandable graphite component of not greater than about 40 wt. % for a total weight of the raw material mixture, such as, not greater than about 38 wt. % or not greater than about 36 wt. % or not greater than about 34 wt. % or not greater than about 32 wt. % or not greater than about 31 wt. % or not greater than about 31 wt. % or not greater than about 30 wt. % or not greater than about 29 wt. % or not greater than about 28 wt. % or not greater than about 27 wt. % or not greater than about 26 wt. % or not greater than about 25 wt. % or not greater than about 24 wt. % or not greater than about 23 wt. % or not greater than about 22 wt. % or not greater than about 21 wt. % or not greater than about 20 wt. % or not greater than about 19 wt. % or even not greater than about 18 wt. %. It will be appreciated that the content of the raw expandable graphite component in the raw material mixture may be within a range between any of the minimum and maximum values noted above. It will be further appreciated that the content of the raw expandable graphite component in the raw material mixture may be any value between any of the minimum and maximum values noted above.

According to still other embodiments, the raw material mixture may further include a raw melamine component.

According to certain embodiments, the raw material mixture may include a particular content of the raw melamine component. For example, the raw material mixture may include a content of the raw melamine component of at least about 4.0 wt. % for a total weight of the raw material mixture, such as, at least about 4.2 wt. % or at least about 4.5 wt. % or at least about 4.8 wt. % or at least about 5.0 wt. % or at least about 5.2 wt. % or at least about 5.5 wt. % or at least about 5.8 wt. % or at least about 6.0 wt. % or at least about 6.2 wt. % or at least about 6.5 wt. % or at least about 6.8 wt. % or at least about 7.0 wt. % or at least about 7.2 wt. % or at least about 7.5 wt. % or at least about 7.8 wt. % or at least about 8.0 wt. % or at least about 8.2 wt. % or even at least about 8.5 wt. %. According to yet other embodiments, the raw material mixture may include a content of the raw melamine component of not greater than about 13 wt. % for a total weight of the raw material mixture, such as, not greater than about 12.8 wt. % or not greater than about 12.5 wt. % or not greater than about 12.2 wt. % or not greater than about 12.0 wt. % or not greater than about 11.8 wt. % or not greater than about 11.5 wt. % or not greater than about 11.2 wt. % or not greater than about 11.0 wt. % or not greater than about 10.8 wt. % or not greater than about 10.5 wt. % or not greater than about 10.2 wt. % or not greater than about 10.0 wt. % or not greater than about 9.8 wt. % or even not greater than about 9.5 wt. %. It will be appreciated that the content of the raw melamine component in the raw material mixture may be within a range between any of the minimum and maximum values noted above. It will be further appreciated that the content of the raw melamine component in the raw material mixture may be any value between any of the minimum and maximum values noted above.

According to still other embodiments, the raw material mixture may further include a raw isocyanate component.

According to certain embodiments, the raw material mixture may include a particular content of the raw isocyanate component. For example, the raw material mixture may include a content of the raw isocyanate component of at least about 1 wt. % for a total weight of the raw material mixture, such as, at least about 1.5 wt. % or at least about 2.0 wt. % or at least about 2.5 wt. % or at least about 3.0 wt. % or at least about 3.5 wt. % or even at least about 4.0 wt. %. According to yet other embodiments, the raw material mixture may include a content of the raw isocyanate component of not greater than about 9.0 wt. % for a total weight of the raw material mixture, such as, not greater than about 8.5 wt. % or not greater than about 8.0 wt. % or not greater than about 7.5 wt. % or not greater than about 7.0 wt. % or not greater than about 6.5 wt. % or not greater than about 6.0 wt. % or not greater than about 5.5 wt. % or even not greater than about 5.0 wt. %. It will be appreciated that the content of the raw isocyanate component in the raw material mixture may be within a range between any of the minimum and maximum values noted above. It will be further appreciated that the content of raw isocyanate component in the raw material mixture may be any value between any of the minimum and maximum values noted above.

According to still other embodiments, the raw isocyanate component may include monomeric methylenediphenyl diisocyanate (MDI), modified MDI, polymeric MDI and combinations thereof.

According to still other embodiments, the raw material mixture may further include a raw surfactant component.

According to certain embodiments, the raw material mixture may include a particular content of the raw surfactant component. For example, the raw material mixture may include a content of the raw surfactant component of at least about 1 wt. % for a total weight of the raw material mixture, such as, at least about 1.5 wt. % or at least about 2.0 wt. % or at least about 2.5 wt. % or at least about 3.0 wt. % or at least about 3.5 wt. % or even at least about 4.0 wt. %. According to yet other embodiments, the raw material mixture may include a content of the raw surfactant component of not greater than about 9.0 wt. % for a total weight of the raw material mixture, such as, not greater than about 8.5 wt. % or not greater than about 8.0 wt. % or not greater than about 7.5 wt. % or not greater than about 7.0 wt. % or not greater than about 6.5 wt. % or not greater than about 6.0 wt. % or not greater than about 5.5 wt. % or even not greater than about 5.0 wt. %. It will be appreciated that the content of the raw surfactant component in the raw material mixture may be within a range between any of the minimum and maximum values noted above. It will be further appreciated that the content of raw surfactant component in the raw material mixture may be any value between any of the minimum and maximum values noted above.

According to still other embodiments, the raw surfactant component may include block copolymers of dimethysiloxane and polyether, which may have various forms, such as, linear, branched, or pendant.

According to still other embodiments, the raw material mixture may further include a raw catalyst component.

According to certain embodiments, the raw material mixture may include a particular content of the raw catalyst component. For example, the raw material mixture may include a content of the raw catalyst component of at least about 0.1 wt. % for a total weight of the raw material mixture, such as, at least about 0.25 wt. % or at least about 0.5 wt. % or at least about 0.75 wt. % or at least about 1.0 wt. % or at least about 1.25 wt. % or even at least about 1.5 wt. %. According to yet other embodiments, the raw material mixture may include a content of the raw catalyst component of not greater than about 5.0 wt. % for a total weight of the raw material mixture, such as, not greater than about 4.75 wt. % or not greater than about 4.5 wt. % or not greater than about 4.25 wt. % or not greater than about 4.0 wt. % or not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or even not greater than about 2.0 wt. %. It will be appreciated that the content of the raw catalyst component in the raw material mixture may be within a range between any of the minimum and maximum values noted above. It will be further appreciated that the content of raw catalyst component in the raw material mixture may be any value between any of the minimum and maximum values noted above.

According to still other embodiments, the raw catalyst component may include metal catalysts containing metal component such as tin, cooper, lead, zinc, cobalt, or nickel, and amine catalysts such as tertiary amine or quaternary ammonium salt.

According to still other embodiments, the raw material mixture may further include a raw pigment component.

According to certain embodiments, the raw material mixture may include a particular content of the raw pigment component. For example, the raw material mixture may include a content of the raw pigment component of at least about 0.1 wt. % for a total weight of the raw material mixture, such as, at least about 0.25 wt. % or at least about 0.5 wt. % or at least about 0.75 wt. % or at least about 1.0 wt. % or at least about 1.25 wt. % or even at least about 1.5 wt. %. According to yet other embodiments, the raw material mixture may include a content of the raw pigment component of not greater than about 5.0 wt. % for a total weight of the raw material mixture, such as, not greater than about 4.75 wt. % or not greater than about 4.5 wt. % or not greater than about 4.25 wt. % or not greater than about 4.0 wt. % or not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or even not greater than about 2.0 wt. %. It will be appreciated that the content of the raw pigment component in the raw material mixture may be within a range between any of the minimum and maximum values noted above. It will be further appreciated that the content of raw pigment component in the raw material mixture may be any value between any of the minimum and maximum values noted above.

According to still other embodiments, the raw pigment component may include carbon dispersions in polyols.

According to still other embodiments, the raw material mixture may further include a raw chain extender component.

According to certain embodiments, the raw material mixture may include a particular content of the raw chain extender component. For example, the raw material mixture may include a content of the raw chain extender component of at least about 0.1 wt. % for a total weight of the raw material mixture, such as, at least about 0.25 wt. % or at least about 0.5 wt. % or at least about 0.75 wt. % or at least about 1.0 wt. % or at least about 1.25 wt. % or even at least about 1.5 wt. %. According to yet other embodiments, the raw material mixture may include a content of the raw chain extender component of not greater than about 5.0 wt. % for a total weight of the raw material mixture, such as, not greater than about 4.75 wt. % or not greater than about 4.5 wt. % or not greater than about 4.25 wt. % or not greater than about 4.0 wt. % or not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or even not greater than about 2.0 wt. %. It will be appreciated that the content of the raw chain extender component in the raw material mixture may be within a range between any of the minimum and maximum values noted above. It will be further appreciated that the content of raw chain extender component in the raw material mixture may be any value between any of the minimum and maximum values noted above.

According to still other embodiments, the raw chain extender component may include compounds with at least two isocyanate reactive groups such as diethylene glycol, triethylene glycol, dipropylene glycol, or tri propylene glycol.

According to still other embodiments, the raw material mixture may further include a raw thixotropic agent component.

According to certain embodiments, the raw material mixture may include a particular content of the raw thixotropic agent component. For example, the raw material mixture may include a content of the raw thixotropic agent component of at least about 0.1 wt. % for a total weight of the raw material mixture or at least about 0.25 wt. %, such as, at least about 0.5 wt. % or even at least about 0.75 wt. %. According to yet other embodiments, the raw material mixture may include a content of the raw thixotropic agent component of not greater than about 4.0 wt. % for a total weight of the raw material mixture, such as, not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or not greater than about 2.0 wt. % or not greater than about 1.75 wt. % or not greater than about 1.5 wt. % or not greater than about 1.25 wt. % or even not greater than about 1.0 wt. %. It will be appreciated that the content of the raw thixotropic agent component in the raw material mixture may be within a range between any of the minimum and maximum values noted above. It will be further appreciated that the content of raw thixotropic agent component in the raw material mixture may be any value between any of the minimum and maximum values noted above.

According to still other embodiments, the raw thixotropic agent component may include aerosol, bentonite, polyuria compounds or combinations thereof.

According to still other embodiments, providing the raw material mixture may include adding the raw phosphorous polyol component to the raw base polyol component to form a first mixture and stirring the first mixture to form a first homogeneous dispersion. According to still other embodiments, providing the raw material mixture may further include adding the raw expandable graphite component to the first homogeneous dispersion to form a second mixture and stirring the second mixture to form a second homogeneous dispersion.

According to yet other embodiments, providing the raw material mixture may further include adding the raw isocyanate component to the second homogeneous dispersion to form a third homogeneous dispersion and stirring the third mixture to form the raw material mixture.

According to yet other embodiments, forming the raw material mixture into a polyurethane foam may include forming the raw material mixture to form a foamed material mixture. According to still other embodiments, forming the raw material mixture into a polyurethane foam may further include curing the formed material mixture to form the polyurethane foam.

Referring now to the polyurethane foam formed according to embodiments described herein, the polyurethane foam may include a base polyol component, a phosphorous polyol component, and an expandable graphite.

According to particular embodiments, the polyurethane foam formed according to embodiments described herein may have a V0 rating based on a UL94 flame retardancy test performed at a polyurethane foam thickness of 3.5 mm and a polyurethane foam density of 380 kg/m$^3$.

According to other embodiments, the polyurethane foam formed according to embodiments described herein may have a V0 rating based on a UL94 flame retardancy test performed at a polyurethane foam thickness of 3.0 mm and a polyurethane foam density of 380 kg/m$^3$.

According to other embodiments, the polyurethane foam formed according to embodiments described herein may have a V0 rating based on a UL94 flame retardancy test performed at a polyurethane foam thickness of 2.5 mm and a polyurethane foam density of 380 kg/m$^3$.

According to other embodiments, the polyurethane foam formed according to embodiments described herein may have a V0 rating based on a UL94 flame retardancy test performed at a polyurethane foam thickness of 2.0 mm and a polyurethane foam density of 380 kg/m$^3$.

According to particular embodiments, the polyurethane foam formed according to embodiments described herein may have a V0 rating based on a UL94 flame retardancy test performed at a polyurethane foam thickness of 3.5 mm and a polyurethane foam density of 340 kg/m$^3$.

According to other embodiments, the polyurethane foam formed according to embodiments described herein may have a V0 rating based on a UL94 flame retardancy test performed at a polyurethane foam thickness of 3.0 mm and a polyurethane foam density of 340 kg/m$^3$.

According to other embodiments, the polyurethane foam formed according to embodiments described herein may have a V0 rating based on a UL94 flame retardancy test performed at a polyurethane foam thickness of 2.5 mm and a polyurethane foam density of 340 kg/m$^3$.

According to other embodiments, the polyurethane foam formed according to embodiments described herein may have a V0 rating based on a UL94 flame retardancy test performed at a polyurethane foam thickness of 2.0 mm and a polyurethane foam density of 340 kg/m$^3$.

According to particular embodiments, the polyurethane foam formed according to embodiments described herein may have a V0 rating based on a UL94 flame retardancy test performed at a polyurethane foam thickness of 3.5 mm and a polyurethane foam density of 300 kg/m$^3$.

According to other embodiments, the polyurethane foam formed according to embodiments described herein may have a V0 rating based on a UL94 flame retardancy test performed at a polyurethane foam thickness of 3.0 mm and a polyurethane foam density of 300 kg/m$^3$.

According to other embodiments, the polyurethane foam formed according to embodiments described herein may have a V0 rating based on a UL94 flame retardancy test performed at a polyurethane foam thickness of 2.5 mm and a polyurethane foam density of 300 kg/m$^3$.

According to other embodiments, the polyurethane foam formed according to embodiments described herein may have a V0 rating based on a UL94 flame retardancy test performed at a polyurethane foam thickness of 2.0 mm and a polyurethane foam density of 300 kg/m$^3$.

According to certain embodiments, the polyurethane foam may include a particular content of the base polyol component. For example, the polyurethane foam may include a content of the base polyol component of at least about 20 wt. % for a total weight of the polyurethane foam, such as, at least about 22 wt. % or at least about 24 wt. % or at least about 26 wt. % or at least about 28 wt. % or at least about 30 wt. % or at least about 32 wt. % or at least about 34 wt. % or at least about 36 wt. % or at least about 38 wt. % or even at least about 40 wt. %. According to yet other embodiments, the polyurethane foam may include a content of the base polyol component of not greater than about 60 wt. % for a total weight of the polyurethane foam, such as, not greater than about 58 wt. % or not greater than about 56 wt. % or not greater than about 54 wt. % or not greater than about 52 wt. % or not greater than about 50 wt. % or not greater than about 48 wt. % or not greater than about 46 wt. % or not greater than about 44 wt. % or not greater than about 42 wt. % or not greater than about 40 wt. % or not greater than about 38 wt. % or even not greater than about 36 wt. %. It will be appreciated that the content of the base polyol component in the polyurethane foam may be within a range between any of the minimum and maximum values noted above. It will be further appreciated that the content of the base polyol component in the polyurethane foam may be any value between any of the minimum and maximum values noted above.

According to still other embodiments, the base polyol component may have a particular APH color measurement as measured according to ASTM #D1209. For example, the base polyol component may have an APHA color measurement of not greater than about 50.

According to yet other embodiments, the base polyol component may have a particular OH number. For example, the base polyol component may have an OH number of at least about 52.0 KOH mg/g, such as, at least about 52.1 KOH mg/g or at least about 52.2 KOH mg/g or at least about 52.3 KOH mg/g or at least about 52.4 KOH mg/g or at least about 52.5 KOH mg/g or at least about 52.6 KOH mg/g or at least about 52.7 KOH mg/g or at least about 52.8 KOH mg/g or at least about 52.9 KOH mg/g or at least about 53.0 KOH mg/g or at least about 53.1 KOH mg/g or at least about 53.2 KOH mg/g or at least about 53.3 KOH mg/g or at least about 53.4 KOH mg/g or even at least about 53.5 KOH mg/g. According to still other embodiments, the base polyol component may have an OH number of not greater than about 56.0 KOH mg/g, such as, not greater than about 55.9 KOH mg/g or not greater than about 55.8 KOH mg/g or not greater than about 55.7 KOH mg/g or not greater than about 55.6 KOH mg/g or not greater than about 55.4 KOH mg/g or not greater than about 55.3 KOH mg/g or not greater than about 55.2 KOH mg/g or not greater than about 55.1 KOH mg/g or not greater than about 55.0 KOH mg/g or not greater than about 54.9 KOH mg/g or not greater than about 54.8 KOH mg/g or not greater than about 54.7 KOH mg/g or not greater than about 54.6 KOH mg/g or even not greater than about 54.5 KOH mg/g. It will be appreciated that the OH number of the base polyol component may be within a range between any of the minimum and maximum values noted above. It will be further appreciated that the OH number of the base polyol component may be any value between any of the minimum and maximum values noted above.

According to still other embodiments, the base polyol component may have a particular viscosity as measured according to ASTM #D4878. For example, the base polyol component may have a viscosity of at least about 450 cps/25° C., such as, at least about 455 cps/25° C. or at least about 460 cps/25° C. or at least about 465 cps/25° C. or at least about 470 cps/25° C. or at least about 475 cps/25° C. or at least about 480 cps/25° C. or at least about 485 cps/25° C. or even at least about 490 cps/25° C. According to still other embodiments, the base polyol component may have a viscosity of not greater than about 550 cps/25° C., such as, not greater than about 545 cps/25° C. or not greater than about 540 cps/25° C. or not greater than about 535 cps/25° C. or not greater than about 530 cps/25° C. or not greater than about 525 cps/25° C. or not greater than about 520 cps/25° C. or not greater than about 515 cps/25° C. or even not greater than about 510 cps/25° C. It will be appreciated that the viscosity of the base polyol component may be within a range between any of the minimum and maximum values noted above. It will be further appreciated that the viscosity of the base polyol component may be any value between any of the minimum and maximum values noted above.

According to yet other embodiments, the base polyol component may have a particular acid number. For example, the base polyol component may have an acid number of not greater than about 0.1 KOH mg/g.

According to other embodiments, the base polyol component may have a particular water content. For example, the base polyol component may have a water content of not greater than about 0.5%.

According to yet other embodiments, the base polyol component may have a particular pH. For example, the base polyol component may have a pH of at least about 5.0, such as, at least about 5.1 or at least about 5.2 or at least about 5.3 or at least about 5.4 or at least about 5.5 or at least about 5.6 or at least about 5.7 or at least about 5.8 or at least about 5.9 or even at least about 6.0. According to still other embodiments, the base polyol component may have a pH of not greater than about 8.0, such as, not greater than about 7.9 or not greater than about 7.8 or not greater than about 7.7 or not greater than about 7.6 or not greater than about 7.5 or not greater than about 7.4 or not greater than about 7.3 or not greater than about 7.2 or not greater than about 7.1 or even not greater than about 7.0. It will be appreciated that the pH of the base polyol component may be within a range between any of the minimum and maximum values noted above. It will be further appreciated that the pH of the base polyol component may be any value between any of the minimum and maximum values noted above.

According to still other embodiments, the base polyol component may include polyether polyols, polyester polyols, polymer polyols, bio-based polyols or combinations thereof.

According to certain embodiments, the polyurethane foam may include a particular content of the phosphorous polyol component. For example, the polyurethane foam may include a content of the phosphorous polyol component of at least about 8 wt. % for a total weight of the polyurethane foam, such as, at least about 9 wt. % or at least about 10 wt. % or at least about 11 wt. % or at least about 12 wt. % or at least about 13 wt. % or even at least about 14 wt. %. According to yet other embodiments, the polyurethane foam may include a content of the phosphorous polyol component of not greater than about 40 wt. % for a total weight of the polyurethane foam, such as, not greater than about 38 wt. % or not greater than about 36 wt. % or not greater than about 34 wt. % or not greater than about 32 wt. % or not greater than about 31 wt. % or not greater than about 31 wt. % or not greater than about 30 wt. % or not greater than about 29 wt. % or not greater than about 28 wt. % or not greater than about 27 wt. % or not greater than about 26 wt. % or not greater than about 25 wt. % or not greater than about 24 wt. % or not greater than about 23 wt. % or not greater than about 22 wt. % or not greater than about 21 wt. % or not greater than about 20 wt. % or not greater than about 19 wt. % or even not greater than about 18 wt. %. It will be appreciated that the content of the phosphorous polyol component in the polyurethane foam may be within a range between any of the minimum and maximum values noted above. It will be further appreciated that the content of the phosphorous polyol component in the polyurethane foam may be any value between any of the minimum and maximum values noted above.

According to yet other embodiments, the phosphorous polyol component may include a particular number of ethylene oxide (EO) terminals. For example, the raw phosphorous polyol component may include at least one EO terminal, such as, at least about two EO terminals or at least about three EO terminals or at least about four EO terminals.

According to other embodiments, the phosphorous polyol component may have a particular OH number. For example, the phosphorous polyol component may have an OH number of at least about 80 KOH mg/g, such as, at least about 85 KOH mg/g or at least about 90 KOH mg/g or at least about 95 KOH mg/g or at least about 100 KOH mg/g or at least about 105 KOH mg/g or at least about 110 KOH mg/g or at least about 115 KOH mg/g or at least about 120 KOH mg/g or even at least about 125 KOH mg/g. According to still other embodiments, the phosphorous polyol component may have an OH number of not greater than about 180 KOH mg/g, such as, not greater than about 175 KOH mg/g or not greater than about 170 KOH mg/g or not greater than about 165 KOH mg/g or not greater than about 160 KOH mg/g or not greater than about 155 KOH mg/g or not greater than about 150 KOH mg/g or not greater than about 145 KOH mg/g or not greater than about 140 KOH mg/g or even not greater than about 135 KOH mg/g. It will be appreciated that the OH number of the phosphorous polyol component may be within a range between any of the minimum and maximum values noted above. It will be further appreciated that the OH number of the phosphorous polyol component may be any value between any of the minimum and maximum values noted above.

According to other embodiments, the phosphorous polyol component may have a particular viscosity. For example, the phosphorous polyol component may have a viscosity of at least about 1 Pa*s, such as, at least about 1.1 Pa*s or at least about 1.2 Pa*s or at least about 1.3 Pa*s or at least about 1.4 Pa*s or at least about 1.5 Pa*s or at least about 1.6 Pa*s or at least about 1.7 Pa*s or at least about 1.8 Pa*s or at least about 1.9 Pa*s or even at least about 2.0 Pa*s. According to yet other embodiments, the phosphorous polyol component may have a viscosity of at least about 1 Pa*s, such as, at least about 1.1 Pa*s or at least about 1.2 Pa*s or at least about 1.3 Pa*s or at least about 1.4 Pa*s or at least about 1.5 Pa*s or at least about 1.6 Pa*s or at least about 1.7 Pa*s or at least about 1.8 Pa*s or at least about 1.9 Pa*s or even at least about 2.0 Pa*s. It will be appreciated that the viscosity of the phosphorous polyol component may be within a range between any of the minimum and maximum values noted above. It will be further appreciated that the viscosity of the phosphorous polyol component may be any value between any of the minimum and maximum values noted above.

According to other embodiments, the phosphorous polyol component may have a particular molecular mass. For example, the phosphorous polyol component may have a molecular mass of at least about 700, such as, at least about 710 or at least about 720 or at least about 730 or at least about 740 or at least about 750 or at least about 760 or at least about 770 or at least about 780 or at least about 790 or at least about 800 or at least about 810 or at least about 820 or at least about 830 or at least about 840 or at least about 850 or even at least about 860. According to still other embodiments, the phosphorous polyol component may have a molecular mass of not greater than about 920, such as, not greater than about 910 or not greater than about 900 or not greater than about 890 or not greater than about 880 or even not greater than about 870. It will be appreciated that the molecular mass of the phosphorous polyol component may be within a range between any of the minimum and maximum values noted above. It will be further appreciated that the molecular mass of the phosphorous polyol component may be any value between any of the minimum and maximum values noted above.

According to yet other embodiments, the phosphorous polyol component may have a particular functionality. For example, the raw phosphorous polyol component may have a functionality of at least 1, such as, at least 2 or at least 3 or at least 4 or at least 5 or at least 6.

According to still other embodiments, the phosphorous polyol component may include phosphate types, phosphonate types, phosphinate types, phosphite types, phosphorous compounds having hydroxyl groups or combinations thereof.

According to certain embodiments, the polyurethane foam may include a particular content of the expandable graphite. For example, the polyurethane foam may include a content of the expandable graphite of at least about 8 wt. % for a total weight of the polyurethane foam, such as, at least about 9 wt. % or at least about 10 wt. % or at least about 11 wt. % or at least about 12 wt. % or at least about 13 wt. % or even at least about 14 wt. %. According to yet other embodiments, the polyurethane foam may include a content of the expandable graphite of not greater than about 40 wt. % for a total weight of the polyurethane foam, such as, not greater than about 38 wt. % or not greater than about 36 wt. % or not greater than about 34 wt. % or not greater than about 32 wt. % or not greater than about 31 wt. % or not greater than about 31 wt. % or not greater than about 30 wt. % or not greater than about 29 wt. % or not greater than about 28 wt. % or not greater than about 27 wt. % or not greater than about 26 wt. % or not greater than about 25 wt. % or not greater than about 24 wt. % or not greater than about 23 wt. % or not greater than about 22 wt. % or not greater than about 21 wt. % or not greater than about 20 wt. % or not greater than about 19 wt. % or even not greater than about 18 wt. %. It will be appreciated that the content of the expandable graphite in the polyurethane foam may be within a range between any of the minimum and maximum values noted above. It will be further appreciated that the content of the expandable graphite in the polyurethane foam may be any value between any of the minimum and maximum values noted above.

According to still other embodiments, the polyurethane foam may further include melamine cyanurate.

According to certain embodiments, the polyurethane foam may include a particular content of the melamine cyanurate. For example, the polyurethane foam may include a content of the melamine cyanurate of at least about 4.0 wt. % for a total weight of the polyurethane foam, such as, at least about 4.2 wt. % or at least about 4.5 wt. % or at least about 4.8 wt. % or at least about 5.0 wt. % or at least about 5.2 wt. % or at least about 5.5 wt. % or at least about 5.8 wt. % or at least about 6.0 wt. % or at least about 6.2 wt. % or at least about 6.5 wt. % or at least about 6.8 wt. % or at least about 7.0 wt. % or at least about 7.2 wt. % or at least about 7.5 wt. % or at least about 7.8 wt. % or at least about 8.0 wt. % or at least about 8.2 wt. % or even at least about 8.5 wt. %. According to yet other embodiments, the polyurethane foam may include a content of the melamine cyanurate of not greater than about 13 wt. % for a total weight of the polyurethane foam, such as, not greater than about 12.8 wt. % or not greater than about 12.5 wt. % or not greater than about 12.2 wt. % or not greater than about 12.0 wt. % or not greater than about 11.8 wt. % or not greater than about 11.5 wt. % or not greater than about 11.2 wt. % or not greater than about 11.0 wt. % or not greater than about 10.8 wt. % or not greater than about 10.5 wt. % or not greater than about 10.2 wt. % or not greater than about 10.0 wt. % or not greater than about 9.8 wt. % or even not greater than about 9.5 wt. %. It will be appreciated that the content of the melamine cyanurate in the polyurethane foam may be within a range between any of the minimum and maximum values noted above. It will be further appreciated that the content of the melamine cyanurate in the polyurethane foam may be any value between any of the minimum and maximum values noted above.

According to still other embodiments, the polyurethane foam may further include an isocyanate.

According to certain embodiments, the polyurethane foam may include a particular content of the isocyanate. For example, the polyurethane foam may include a content of the isocyanate of at least about 1 wt. % for a total weight of the polyurethane foam, such as, at least about 1.5 wt. % or at least about 2.0 wt. % or at least about 2.5 wt. % or at least about 3.0 wt. % or at least about 3.5 wt. % or even at least about 4.0 wt. %. According to yet other embodiments, the polyurethane foam may include a content of the isocyanate of not greater than about 9.0 wt. % for a total weight of the polyurethane foam, such as, not greater than about 8.5 wt. % or not greater than about 8.0 wt. % or not greater than about 7.5 wt. % or not greater than about 7.0 wt. % or not greater than about 6.5 wt. % or not greater than about 6.0 wt. % or not greater than about 5.5 wt. % or even not greater than about 5.0 wt. %. It will be appreciated that the content of the isocyanate in the polyurethane foam may be within a range between any of the minimum and maximum values noted above. It will be further appreciated that the content of isocyanate in the polyurethane foam may be any value between any of the minimum and maximum values noted above.

According to still other embodiments, the isocyanate may include monomeric methylenediphenyl diisocyanate (MDI), modified MDI, polymeric MDI and combinations thereof.

According to still other embodiments, the polyurethane foam may further include a surfactant.

According to certain embodiments, the polyurethane foam may include a particular content of the surfactant. For example, the polyurethane foam may include a content of the surfactant of at least about 1 wt. % for a total weight of the polyurethane foam, such as, at least about 1.5 wt. % or at least about 2.0 wt. % or at least about 2.5 wt. % or at least about 3.0 wt. % or at least about 3.5 wt. % or even at least about 4.0 wt. %. According to yet other embodiments, the polyurethane foam may include a content of the surfactant of not greater than about 9.0 wt. % for a total weight of the polyurethane foam, such as, not greater than about 8.5 wt. % or not greater than about 8.0 wt. % or not greater than about 7.5 wt. % or not greater than about 7.0 wt. % or not greater than about 6.5 wt. % or not greater than about 6.0 wt. % or not greater than about 5.5 wt. % or even not greater than about 5.0 wt. %. It will be appreciated that the content of the surfactant in the polyurethane foam may be within a range between any of the minimum and maximum values noted above. It will be further appreciated that the content of surfactant in the polyurethane foam may be any value between any of the minimum and maximum values noted above.

According to still other embodiments, the surfactant may include block copolymers of dimethysiloxane and polyether, which may have various forms, such as, linear, branched, or pendant.

According to still other embodiments, the polyurethane foam may further include a catalyst.

According to certain embodiments, the polyurethane foam may include a particular content of the catalyst. For example, the polyurethane foam may include a content of the catalyst of at least about 0.1 wt. % for a total weight of the polyurethane foam, such as, at least about 0.25 wt. % or at least about 0.5 wt. % or at least about 0.75 wt. % or at least about 1.0 wt. % or at least about 1.25 wt. % or even at least about 1.5 wt. %. According to yet other embodiments, the polyurethane foam may include a content of the catalyst of not greater than about 5.0 wt. % for a total weight of the polyurethane foam, such as, not greater than about 4.75 wt. % or not greater than about 4.5 wt. % or not greater than about 4.25 wt. % or not greater than about 4.0 wt. % or not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or even not greater than about 2.0 wt. %. It will be appreciated that the content of the catalyst in the polyurethane foam may be within a range between any of the minimum and maximum values noted above. It will be further appreciated that the content of catalyst in the polyurethane foam may be any value between any of the minimum and maximum values noted above.

According to still other embodiments, the catalyst may include metal catalysts containing metal component such as tin, cooper, lead, zinc, cobalt, or nickel, and amine catalysts such as tertiary amine or quaternary ammonium salt.

According to still other embodiments, the polyurethane foam may further include a pigment.

According to certain embodiments, the polyurethane foam may include a particular content of the pigment. For example, the polyurethane foam may include a content of the pigment of at least about 0.1 wt. % for a total weight of the polyurethane foam, such as, at least about 0.25 wt. % or at least about 0.5 wt. % or at least about 0.75 wt. % or at least about 1.0 wt. % or at least about 1.25 wt. % or even at least about 1.5 wt. %. According to yet other embodiments, the polyurethane foam may include a content of the pigment of not greater than about 5.0 wt. % for a total weight of the polyurethane foam, such as, not greater than about 4.75 wt. % or not greater than about 4.5 wt. % or not greater than about 4.25 wt. % or not greater than about 4.0 wt. % or not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or even not greater than about 2.0 wt. %. It will be appreciated that the content of the pigment in the polyurethane foam may be within a range between any of the minimum and maximum values noted above. It will be further appreciated that the content of pigment in the polyurethane foam may be any value between any of the minimum and maximum values noted above.

According to still other embodiments, the pigment may include carbon dispersions in polyols.

According to still other embodiments, the polyurethane foam may further include a chain extender.

According to certain embodiments, the polyurethane foam may include a particular content of the chain extender. For example, the polyurethane foam may include a content of the chain extender of at least about 0.1 wt. % for a total weight of the polyurethane foam, such as, at least about 0.25 wt. % or at least about 0.5 wt. % or at least about 0.75 wt. % or at least about 1.0 wt. % or at least about 1.25 wt. % or even at least about 1.5 wt. %. According to yet other embodiments, the polyurethane foam may include a content of the chain extender of not greater than about 5.0 wt. % for a total weight of the polyurethane foam, such as, not greater than about 4.75 wt. % or not greater than about 4.5 wt. % or not greater than about 4.25 wt. % or not greater than about 4.0 wt. % or not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or even not greater than about 2.0 wt. %. It will be appreciated that the content of the chain extender in the polyurethane foam may be within a range between any of the minimum and maximum values noted above. It will be further appreciated that the content of chain extender in the polyurethane foam may be any value between any of the minimum and maximum values noted above.

According to still other embodiments, the chain extender may include compounds with at least two isocyanate reactive groups such as diethylene glycol, triethylene glycol, dipropylene glycol, or tri propylene glycol.

According to still other embodiments, the polyurethane foam may further include a thixotropic agent.

According to certain embodiments, the polyurethane foam may include a particular content of the thixotropic agent. For example, the polyurethane foam may include a content of the thixotropic agent of at least about 0.1 wt. % for a total weight of the polyurethane foam or at least about 0.25 wt. %, such as, at least about 0.5 wt. % or even at least about 0.75 wt. %. According to yet other embodiments, the polyurethane foam may include a content of the thixotropic agent of not greater than about 4.0 wt. % for a total weight of the polyurethane foam, such as, not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or not greater than about 2.0 wt. % or not greater than about 1.75 wt. % or not greater than about 1.5 wt. % or not greater than about 1.25 wt. % or even not greater than about 1.0 wt. %. It will be appreciated that the content of the thixotropic agent in the polyurethane foam may be within a range between any of the minimum and maximum values noted above. It will be further appreciated that the content of thixotropic agent in the polyurethane foam may be any value between any of the minimum and maximum values noted above.

According to still other embodiments, the thixotropic agent may include aerosol, bentonite, polyuria compounds or combinations thereof.

According to yet other embodiments, the polyurethane foam may have a particular thickness. For example, the polyurethane foam may have a thickness of at least about 0.5 mm, such as, at least about 0.55 mm or at least about 0.6 mm or at least about 0.65 mm or at least about 0.7 mm or even at least about 0.75 mm. According to still other embodiments, the polyurethane foam may have a thickness of not greater than about 15 mm, such as, not greater than about 14.5 mm or not greater than about 14.0 mm or not greater than about 13.5 mm or not greater than about 13.0 mm or not greater than about 12.5 mm or not greater than about 12.0 mm or not greater than about 11.5 mm or not greater than about 11.0 mm or not greater than about 10.5 mm or not greater than about 10.0 mm or not greater than about 9.5 mm or not greater than about 9.0 mm or not greater than about 8.5 mm or not greater than about 8.0 mm or not greater than about 7.5 mm or not greater than about 7.0 mm or not greater than about 6.5 mm or not greater than about 6.0 mm or not greater than about 5.5 mm or not greater than about 5.0 mm or not greater than about 4.5 mm or not greater than about 4.0 mm or not greater than about 3.5 mm or not greater than about 3.0 mm or not greater than about 2.5 mm or not greater than about 2.0 mm or not greater than about 1.5 mm or even not greater than about 1.0 mm. It will be appreciated that the thickness of the polyurethane foam may be within a range between any of the minimum and maximum values noted above. It will be further appreciated that the thickness of the polyurethane foam may be any value between any of the minimum and maximum values noted above.

According to yet other embodiments, the polyurethane foam may have a particular compression force deflection (CFD) as measured according to ASTM #D3574 at a 20% compression ratio. For example, the polyurethane foam may have a CFD of at least about 5 KPa as measured at 20% compression ratio.

According to yet other embodiments, the polyurethane foam may have a particular compression force deflection (CFD) as measured according to ASTM #D3574 at a 70% compression ratio. For example, the polyurethane foam may have a CFD of not greater than about 005 KPa as measured at 20% compression ratio.

According to still other embodiments, the polyurethane foam may have a particular compression set (C-set) as measured according to ASTM #D3574 at 70° C. for 7 days. For example, the polyurethane foam may have a C-set of not greater than about 10% or not greater than about 9% or not greater than about 8% or not greater than about 7% or not greater than about 6% or not greater than about 5% or not greater than about 4% or not greater than about 3% or not greater than about 2% or not greater than about 1% or substantially no C-set. It will be appreciated that the C-set of the polyurethane foam may be within a range between any of the values noted above. It will be further appreciated that the C-set of the polyurethane foam may be any value between any of the values noted above.

Referring now to a particular use of the polyurethane foam formed according to embodiments described herein, a particular embodiment may include a battery compression pad that may include a polyurethane foam. It will be appreciated that the polyurethane foam of the battery compression pad may be formed according to any of the embodiments described herein. It will be further appreciated that the polyurethane foam of the batter compression pad may include any of the components described in reference to any of the embodiments described herein. It will be still further appreciated that the polyurethane foam of the battery compression pad may include any of the characteristics described in reference to embodiments described herein.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1. A polyurethane foam comprising: a base polyol component; a phosphorous polyol component; and an expandable graphite, wherein the polyurethane foam comprises a V0 rating based on a UL94 flame retardancy test performed at a polyurethane foam thickness of 3.5 mm and a polyurethane foam density of 380 kg/m$^3$.

Embodiment 2. The polyurethane foam of embodiment 1, wherein the phosphorous polyol component comprises at least one ethylene oxide (EO) terminal.

Embodiment 3. The polyurethane foam of embodiment 2, wherein phosphorous polyol component comprises an ethylene oxide content of not greater than about 30%.

Embodiment 4. The polyurethane foam of embodiment 1, wherein the phosphorous polyol component comprises an OH number of at least about 80 KOH mg/g or at least about 85 KOH mg/g or at least about 90 KOH mg/g or at least about 95 KOH mg/g or at least about 100 KOH mg/g or at least about 105 KOH mg/g or at least about 110 KOH mg/g or at least about 115 KOH mg/g or at least about 120 KOH mg/g or at least about 125 KOH mg/g.

Embodiment 5. The polyurethane foam of embodiment 1, wherein the phosphorous polyol component comprises an OH number of not greater than about 180 KOH mg/g or not greater than about 175 KOH mg/g or not greater than about 170 KOH mg/g or not greater than about 165 KOH mg/g or not greater than about 160 KOH mg/g or not greater than about 155 KOH mg/g or not greater than about 150 KOH mg/g or not greater than about 145 KOH mg/g or not greater than about 140 KOH mg/g or not greater than about 135 KOH mg/g.

Embodiment 6. The polyurethane foam of embodiment 1, wherein the phosphorous polyol component comprises a viscosity of at least about 1 Pa*s or at least about 1.1 Pa*s or at least about 1.2 Pa*s or at least about 1.3 Pa*s or at least about 1.4 Pa*s or at least about 1.5 Pa*s or at least about 1.6 Pa*s or at least about 1.7 Pa*s or at least about 1.8 Pa*s or at least about 1.9 Pa*s or at least about 2.0 Pa*s.

Embodiment 7. The polyurethane foam of embodiment 1, wherein the phosphorous polyol component comprises a viscosity of not greater than about 4 PA*s or not greater than about 3.9 PA*s or not greater than about 3.8 PA*s or not greater than about 3.7 PA*s or not greater than about 3.6 PA*s or not greater than about 3.5 PA*s or not greater than about 3.4 PA*s or not greater than about 3.3 PA*s or not greater than about 3.2 PA*s or not greater than about 3.1 PA*s or not greater than about 3.0 PA*s or not greater than about 2.9 PA*s or not greater than about 2.8 PA*s or not greater than about 2.7 PA*s or not greater than about 2.6 PA*s or not greater than about 2.5 PA*s or not greater than about 2.4 PA*s or not greater than about 2.3 PA*s or not greater than about 2.2 PA*s.

Embodiment 8. The polyurethane foam of embodiment 1, wherein the phosphorous polyol component comprises a molecular weight of at least about 700 or at least about 710 or at least about 720 or at least about 730 or at least about 740 or at least about 750 or at least about 760 or at least about 770 or at least about 780 or at least about 790 or at least about 800 or at least about 810 or at least about 820 or at least about 830 or at least about 840 or at least about 850 or at least about 860.

Embodiment 9. The polyurethane foam of embodiment 1, wherein the phosphorous polyol component comprises a molecular weight of not greater than about 920 or not greater than about 910 or not greater than about 900 or not greater than about 890 or not greater than about 880 or not greater than about 870.

Embodiment 10. The polyurethane foam of embodiment 1, wherein the phosphorous polyol component has a functionality of 2.

Embodiment 11. The polyurethane foam of embodiment 1, wherein the polyurethane foam comprises a content of phosphorous polyol component of at least about 8 wt. % for a total weight of the polyurethane foam or at least about 9 wt. % or at least about 10 wt. % or at least about 11 wt. % or at least about 12 wt. % or at least about 13 wt. % or at least about 14 wt. %.

Embodiment 12. The polyurethane foam of embodiment 1, wherein the polyurethane foam comprises a content of phosphorous polyol component of not greater than about 40 wt. % for a total weight of the polyurethane foam or not greater than about 38 wt. % or not greater than about 36 wt. % or not greater than about 34 wt. % or not greater than about 32 wt. % or not greater than about 31 wt. % or not greater than about 31 wt. % or not greater than about 30 wt. % or not greater than about 29 wt. % or not greater than about 28 wt. % or not greater than about 27 wt. % or not greater than about 26 wt. % or not greater than about 25 wt. % or not greater than about 24 wt. % or not greater than about 23 wt. % or not greater than about 22 wt. % or not greater than about 21 wt. % or not greater than about 20 wt. % or not greater than about 19 wt. % or not greater than about 18 wt. %.

Embodiment 13. The polyurethane foam of embodiment 1, wherein the polyurethane foam comprises a content of expandable graphite of at least about 8 wt. % for a total weight of the polyurethane foam or at least about 9 wt. % or at least about 10 wt. % or at least about 11 wt. % or at least about 12 wt. % or at least about 13 wt. % or at least about 14 wt. %.

Embodiment 14. The polyurethane foam of embodiment 1, wherein the polyurethane foam comprises a content of expandable graphite of not greater than about 40 wt. % for a total weight of the polyurethane foam or not greater than about 38 wt. % or not greater than about 36 wt. % or not greater than about 34 wt. % or not greater than about 32 wt. % or not greater than about 31 wt. % or not greater than about 31 wt. % or not greater than about 30 wt. % or not greater than about 29 wt. % or not greater than about 28 wt. % or not greater than about 27 wt. % or not greater than about 26 wt. % or not greater than about 25 wt. % or not greater than about 24 wt. % or not greater than about 23 wt. % or not greater than about 22 wt. % or not greater than about 21 wt. % or not greater than about 20 wt. % or not greater than about 19 wt. % or not greater than about 18 wt. %.

Embodiment 15. The polyurethane foam of embodiment 1, wherein the polyurethane foam comprises a content of base polyol component of at least about 20 wt. % for a total weight of the polyurethane foam or at least about 22 wt. % or at least about 24 wt. % or at least about 26 wt. % or at least about 28 wt. % or at least about 30 wt. % or at least about 32 wt. % or at least about 34 wt. % or at least about 36 wt. % or at least about 38 wt. % or at least about 40 wt. %.

Embodiment 16. The polyurethane foam of embodiment 1, wherein the polyurethane foam comprises a content of base polyol component of not greater than about 60 wt. % for a total weight of the polyurethane foam or not greater than about 58 wt. % or not greater than about 56 wt. % or not greater than about 54 wt. % or not greater than about 52 wt. % or not greater than about 50 wt. % or not greater than about 48 wt. % or not greater than about 46 wt. % or not greater than about 44 wt. % or not greater than about 42 wt. % or not greater than about 40 wt. % or not greater than about 38 wt. % or not greater than about 36 wt. %.

Embodiment 17. The polyurethane foam of embodiment 1, wherein the base polyol component comprises an APHA color measurement of not greater than about 50.

Embodiment 18. The polyurethane foam of embodiment 1, wherein the base polyol component comprises an OH number of at least about 52 KOH mg/g.

Embodiment 19. The polyurethane foam of embodiment 1, wherein the base polyol component comprises an OH number of not greater than about 56 KOH mg/g.

Embodiment 20. The polyurethane foam of embodiment 1, wherein the base polyol component comprises a viscosity of at least about 450 cps/25° C. or at least about 455 cps/25° C. or at least about 460 cps/25° C. or at least about 465 cps/25° C. or at least about 470 cps/25° C. or at least about 475 cps/25° C. or at least about 480 cps/25° C. or at least about 485 cps/25° C. or at least about 490 cps/25° C.

Embodiment 21. The polyurethane foam of embodiment 1, wherein the base polyol component comprises a viscosity of not greater than about 550 cps/25° C. or not greater than about 545 cps/25° C. or not greater than about 540 cps/25° C. or not greater than about 535 cps/25° C. or not greater than about 530 cps/25° C. or not greater than about 525 cps/25° C. or not greater than about 520 cps/25° C. or not greater than about 515 cps/25° C. or not greater than about 510 cps/25° C.

Embodiment 22. The polyurethane foam of embodiment 1, wherein the base polyol component comprises an acid number of not greater than about 0.1 KOH mg/g.

Embodiment 23. The polyurethane foam of embodiment 1, wherein the base polyol component comprises a water content of not greater than about 0.05%.

Embodiment 24. The polyurethane foam of embodiment 1, wherein the base polyol component comprises a pH of at least about 5.0 or at least about 5.1 or at least about 5.2 or at least about 5.3 or at least about 5.4 or at least about 5.5 or at least about 5.6 or at least about 5.7 or at least about 5.8 or at least about 5.9 or at least about 6.0.

Embodiment 25. The polyurethane foam of embodiment 1, wherein the base polyol component comprises a pH of not greater than about 8.0 or not greater than about 7.9 or not greater than about 7.8 or not greater than about 7.7 or not greater than about 7.6 or not greater than about 7.5 or not greater than about 7.4 or not greater than about 7.3 or not greater than about 7.2 or not greater than about 7.1 or not greater than about 7.0.

Embodiment 26. The polyurethane foam of embodiment 1, wherein the polyurethane foam further comprises melamine cyanurate and wherein the polyurethane foam comprises a content of the melamine cyanurate of at least about 4.0 wt. % for a total weight of the polyurethane foam or at least about 4.2 wt. % or at least about 4.5 wt. % or at least about 4.8 wt. % or at least about 5.0 wt. % or at least about 5.2 wt. % or at least about 5.5 wt. % or at least about 5.8 wt. % or at least about 6.0 wt. % or at least about 6.2 wt. % or at least about 6.5 wt. % or at least about 6.8 wt. % or at least about 7.0 wt. % or at least about 7.2 wt. % or at least about 7.5 wt. % or at least about 7.8 wt. % or at least about 8.0 wt. % or at least about 8.2 wt. % or at least about 8.5 wt. %.

Embodiment 27. The polyurethane foam of embodiment 1, wherein the polyurethane foam further comprises melamine cyanurate and wherein the polyurethane foam comprises a content of the of the melamine cyanurate of not greater than about 13 wt. % for a total weight of the polyurethane foam or not greater than about 12.8 wt. % or not greater than about 12.5 wt. % or not greater than about 12.2 wt. % or not greater than about 12.0 wt. % or not greater than about 11.8 wt. % or not greater than about 11.5 wt. % or not greater than about 11.2 wt. % or not greater than about 11.0 wt. % or not greater than about 10.8 wt. % or not greater than about 10.5 wt. % or not greater than about 10.2 wt. % or not greater than about 10.0 wt. % or not greater than about 9.8 wt. % or not greater than about 9.5 wt. %.

Embodiment 28. The polyurethane foam of embodiment 1, wherein the polyurethane foam comprises a surfactant.

Embodiment 29. The polyurethane foam of embodiment 28, wherein the polyurethane foam comprises a content of the surfactant of at least about 1 wt. % for a total weight of the polyurethane foam or at least about 1.5 wt. % or at least about 2.0 wt. % or at least about 2.5 wt. % or at least about 3.0 wt. % or at least about 3.5 wt. % or at least about 4.0 wt. %.

Embodiment 30. The polyurethane foam of embodiment 28, wherein the polyurethane foam comprises a content of the surfactant of not greater than about 9.0 wt. % for a total weight of the polyurethane foam or not greater than about 8.5 wt. % or not greater than about 8.0 wt. % or not greater than about 7.5 wt. % or not greater than about 7.0 wt. % or not greater than about 6.5 wt. % or not greater than about 6.0 wt. % or not greater than about 5.5 wt. % or not greater than about 5.0 wt. %.

Embodiment 31. The polyurethane foam of embodiment 1, wherein the polyurethane foam comprises a catalyst.

Embodiment 32. The polyurethane foam of embodiment 31, wherein the polyurethane foam comprises a content of the catalyst of at least about 0.1 wt. % for a total weight of the polyurethane foam or at least about 0.25 wt. % or at least about 0.5 wt. % or at least about 0.75 wt. % or at least about 1.0 wt. % or at least about 1.25 wt. % or at least about 1.5 wt. %.

Embodiment 33. The polyurethane foam of embodiment 31, wherein the polyurethane foam comprises a content of the catalyst of not greater than about 5.0 wt. % for a total weight of the polyurethane foam or not greater than about 4.75 wt. % or not greater than about 4.5 wt. % or not greater than about 4.25 wt. % or not greater than about 4.0 wt. % or not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or not greater than about 2.0 wt. %.

Embodiment 34. The polyurethane foam of embodiment 1, wherein the polyurethane foam comprises a pigment.

Embodiment 35. The polyurethane foam of embodiment 34, wherein the polyurethane foam comprises a content of the pigment of at least about 0.1 wt. % for a total weight of the polyurethane foam or at least about 0.25 wt. % or at least about 0.5 wt. % or at least about 0.75 wt. % or at least about 1.0 wt. % or at least about 1.25 wt. % or at least about 1.5 wt. %.

Embodiment 36. The polyurethane foam of embodiment 34, wherein the polyurethane foam comprises a content of the pigment of not greater than about 5.0 wt. % for a total weight of the polyurethane foam or not greater than about 4.75 wt. % or not greater than about 4.5 wt. % or not greater than about 4.25 wt. % or not greater than about 4.0 wt. % or not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or not greater than about 2.0 wt. %.

Embodiment 37. The polyurethane foam of embodiment 1, wherein the polyurethane foam comprises a chain extender.

Embodiment 38. The polyurethane foam of embodiment 37, wherein the polyurethane foam comprises a content of the chain extender of at least about 0.1 wt. % for a total weight of the polyurethane foam or at least about 0.25 wt. % or at least about 0.5 wt. % or at least about 0.75 wt. % or at least about 1.0 wt. % or at least about 1.25 wt. % or at least about 1.5 wt. %.

Embodiment 39. The polyurethane foam of embodiment 37, wherein the polyurethane foam comprises a content of the chain extender of not greater than about 5.0 wt. % for a total weight of the polyurethane foam or not greater than about 4.75 wt. % or not greater than about 4.5 wt. % or not greater than about 4.25 wt. % or not greater than about 4.0 wt. % or not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or not greater than about 2.0 wt. %.

Embodiment 40. The polyurethane foam of embodiment 1, wherein the polyurethane foam comprises a thixotropic agent.

Embodiment 41. The polyurethane foam of embodiment 40, wherein the polyurethane foam comprises a content of the thixotropic agent of at least about 0.1 wt. % for a total weight of the polyurethane foam or at least about 0.25 wt. % or at least about 0.5 wt. % or at least about 0.75 wt. %.

Embodiment 42. The polyurethane foam of embodiment 40, wherein the polyurethane foam comprises a content of the thixotropic agent of not greater than about 4.0 wt. % for a total weight of the polyurethane foam or not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or not greater than about 2.0 wt. % or not greater than about 1.75 wt. % or not greater than about 1.5 wt. % or not greater than about 1.25 wt. % or not greater than about 1.0 wt. %.

Embodiment 43. The polyurethane foam of embodiment 1, wherein the polyurethane foam comprises a thickness of at least about 0.5 mm or at least about 0.55 mm or at least about 0.6 mm or at least about 0.65 mm or at least about 0.7 mm or at least about 0.75 mm.

Embodiment 44. The polyurethane foam of embodiment 1, wherein the polyurethane foam comprises a thickness of not greater than about 15 mm or not greater than about 14.5 mm or not greater than about 14.0 mm or not greater than about 13.5 mm or not greater than about 13.0 mm or not greater than about 12.5 mm or not greater than about 12.0 mm or not greater than about 11.5 mm or not greater than about 11.0 mm or not greater than about 10.5 mm or not greater than about 10.0 mm or not greater than about 9.5 mm or not greater than about 9.0 mm or not greater than about 8.5 mm or not greater than about 8.0 mm or not greater than about 7.5 mm or not greater than about 7.0 mm or not greater than about 6.5 mm or not greater than about 6.0 mm or not greater than about 5.5 mm or not greater than about 5.0 mm or not greater than about 4.5 mm or not greater than about 4.0 mm or not greater than about 3.5 mm or not greater than about 3.0 mm or not greater than about 2.5 mm or not greater than about 2.0 mm or not greater than about 1.5 mm or not greater than about 1.0 mm.

Embodiment 45. The polyurethane foam of embodiment 1, wherein the polyurethane foam comprises a compression force deflection (CFD) of at least about 5 KPa as measured at a 20% compression ratio.

Embodiment 46. The polyurethane foam of embodiment 1, wherein the polyurethane foam comprises a compression force deflection (CFD) of not greater than about 700 KPa as measured at a 70% compression ratio.

Embodiment 47. The polyurethane foam of embodiment 1, wherein the polyurethane foam comprises a compression set (C-set) of not greater than about 10% or not greater than about 9% or not greater than about 8% or not greater than about 7% or not greater than about 6% or not greater than about 5% or not greater than about 4% or not greater than about 3% or not greater than about 2% or not greater than about 1% or substantially no C-set.

Embodiment 48. A method of forming a polyurethane foam comprising: providing a raw material mixture comprising: a raw base polyol component; a raw phosphorous polyol component; and a raw expandable graphite component, and forming the raw material mixture into a polyurethane foam, wherein the polyurethane foam comprises a V0 rating based on a UL94 flame retardancy test performed at a polyurethane foam thickness of 3.5 mm and a polyurethane foam density of 380 kg/m$^3$.

Embodiment 49. The method of embodiment 48, wherein the raw phosphorous polyol component comprises at least one ethylene oxide (EO) terminals.

Embodiment 50. The method of embodiment 49, wherein the raw phosphorous polyol component comprises an ethylene oxide content of not greater than about 30%.

Embodiment 51. The method of embodiment 48, wherein the raw phosphorous polyol component comprises an OH number of at least about 80 KOH mg/g or at least about 85 KOH mg/g or at least about 90 KOH mg/g or at least about 95 KOH mg/g or at least about 100 KOH mg/g or at least about 105 KOH mg/g or at least about 110 KOH mg/g or at least about 115 KOH mg/g or at least about 120 KOH mg/g or at least about 125 KOH mg/g.

Embodiment 52. The method of embodiment 48, wherein the raw phosphorous polyol component comprises an OH number of not greater than about 180 KOH mg/g or not greater than about 175 KOH mg/g or not greater than about 170 KOH mg/g or not greater than about 165 KOH mg/g or not greater than about 160 KOH mg/g or not greater than about 155 KOH mg/g or not greater than about 150 KOH mg/g or not greater than about 145 KOH mg/g or not greater than about 140 KOH mg/g or not greater than about 135 KOH mg/g.

Embodiment 53. The method of embodiment 48, wherein the raw phosphorous polyol component comprises a viscosity of at least about 1 Pa*s or at least about 1.1 Pa*s or at least about 1.2 Pa*s or at least about 1.3 Pa*s or at least about 1.4 Pa*s or at least about 1.5 Pa*s or at least about 1.6 Pa*s or at least about 1.7 Pa*s or at least about 1.8 Pa*s or at least about 1.9 Pa*s or at least about 2.0 Pa*s.

Embodiment 54. The method of embodiment 48, wherein the raw phosphorous polyol component comprises a viscosity of not greater than about 4 PA*s or not greater than about 3.9 PA*s or not greater than about 3.8 PA*s or not greater than about 3.7 PA*s or not greater than about 3.6 PA*s or not greater than about 3.5 PA*s or not greater than about 3.4 PA*s or not greater than about 3.3 PA*s or not greater than about 3.2 PA*s or not greater than about 3.1 PA*s or not greater than about 3.0 PA*s or not greater than about 2.9 PA*s or not greater than about 2.8 PA*s or not greater than about 2.7 PA*s or not greater than about 2.6 PA*s or not greater than about 2.5 PA*s or not greater than about 2.4 PA*s or not greater than about 2.3 PA*s or not greater than about 2.2 PA*s.

Embodiment 55. The method of embodiment 48, wherein the raw phosphorous polyol component comprises a molecular weight of at least about 700 or at least about 710 or at least about 720 or at least about 730 or at least about 740 or at least about 750 or at least about 760 or at least about 770 or at least about 780 or at least about 790 or at least about 800 or at least about 810 or at least about 820 or at least about 830 or at least about 840 or at least about 850 or at least about 860.

Embodiment 56. The method of embodiment 48, wherein the raw phosphorous polyol component comprises a molecular weight of not greater than about 920 or not greater than about 910 or not greater than about 900 or not greater than about 890 or not greater than about 880 or not greater than about 870.

Embodiment 57. The method of embodiment 48, wherein the raw phosphorous polyol component has a functionality of 2.

Embodiment 58. The method of embodiment 48, wherein the raw material mixture comprises a content of raw phosphorous polyol component of at least about 8 wt. % for a total weight of the raw material mixture or at least about 9 wt. % or at least about 10 wt. % or at least about 11 wt. % or at least about 12 wt. % or at least about 13 wt. % or at least about 14 wt. %.

Embodiment 59. The method of embodiment 48, wherein the raw material mixture comprises a content of raw phosphorous polyol component of not greater than about 40 wt. % for a total weight of the raw material mixture or not greater than about 38 wt. % or not greater than about 36 wt. % or not greater than about 34 wt. % or not greater than about 32 wt. % or not greater than about 31 wt. % or not greater than about 31 wt. % or not greater than about 30 wt. % or not greater than about 29 wt. % or not greater than about 28 wt. % or not greater than about 27 wt. % or not greater than about 26 wt. % or not greater than about 25 wt. % or not greater than about 24 wt. % or not greater than about 23 wt. % or not greater than about 22 wt. % or not greater than about 21 wt. % or not greater than about 20 wt. % or not greater than about 19 wt. % or not greater than about 18 wt. %.

Embodiment 60. The method of embodiment 48, wherein the raw material mixture comprises a content of raw expandable graphite component of at least about 8 wt. % for a total weight of the raw material mixture or at least about 9 wt. % or at least about 10 wt. % or at least about 11 wt. % or at least about 12 wt. % or at least about 13 wt. % or at least about 14 wt. %.

Embodiment 61. The method of embodiment 48, wherein the raw material mixture comprises a content of raw expandable graphite component of not greater than about 40 wt. % for a total weight of the raw material mixture or not greater than about 38 wt. % or not greater than about 36 wt. % or not greater than about 34 wt. % or not greater than about 32 wt. % or not greater than about 31 wt. % or not greater than about 31 wt. % or not greater than about 30 wt. % or not greater than about 29 wt. % or not greater than about 28 wt. % or not greater than about 27 wt. % or not greater than about 26 wt. % or not greater than about 25 wt. % or not greater than about 24 wt. % or not greater than about 23 wt. % or not greater than about 22 wt. % or not greater than about 21 wt. % or not greater than about 20 wt. % or not greater than about 19 wt. % or not greater than about 18 wt. %.

Embodiment 62. The method of embodiment 48, wherein the raw material mixture comprises a content of the raw base polyol component of at least about 20 wt. % for a total weight of the raw material mixture or at least about 22 wt. % or at least about 24 wt. % or at least about 26 wt. % or at least about 28 wt. % or at least about 30 wt. % or at least about 32 wt. % or at least about 34 wt. % or at least about 36 wt. % or at least about 38 wt. % or at least about 40 wt. %.

Embodiment 63. The method of embodiment 48, wherein the raw material mixture comprises a content of the raw base polyol component of not greater than about 60 wt. % for a total weight of the raw material mixture or not greater than about 58 wt. % or not greater than about 56 wt. % or not greater than about 54 wt. % or not greater than about 52 wt. % or not greater than about 50 wt. % or not greater than about 48 wt. % or not greater than about 46 wt. % or not greater than about 44 wt. % or not greater than about 42 wt. % or not greater than about 40 wt. % or not greater than about 38 wt. % or not greater than about 36 wt. %.

Embodiment 64. The method of embodiment 48, wherein the raw base polyol component comprises an APHA color measurement of not greater than about 50.

Embodiment 65. The method of embodiment 48, wherein the raw base polyol component comprises an OH number of at least about 52 KOH mg/g.

Embodiment 66. The method of embodiment 48, wherein the raw base polyol component comprises an OH number of not greater than about 56 KOH mg/g.

Embodiment 67. The method of embodiment 48, wherein the raw base polyol component comprises a viscosity of at least about 450 cps/25° C. or at least about 455 cps/25° C. or at least about 460 cps/25° C. or at least about 465 cps/25° C. or at least about 470 cps/25° C. or at least about 475 cps/25° C. or at least about 480 cps/25° C. or at least about 485 cps/25° C. or at least about 490 cps/25° C.

Embodiment 68. The method of embodiment 48, wherein the raw base polyol component comprises a viscosity of not greater than about 550 cps/25° C. or not greater than about 545 cps/25° C. or not greater than about 540 cps/25° C. or not greater than about 535 cps/25° C. or not greater than about 530 cps/25° C. or not greater than about 525 cps/25° C. or not greater than about 520 cps/25° C. or not greater than about 515 cps/25° C. or not greater than about 510 cps/25° C.

Embodiment 69. The method of embodiment 48, wherein the raw base polyol component comprises an acid number of not greater than about 0.1 KOH mg/g.

Embodiment 70. The method of embodiment 48, wherein the raw base polyol component comprises a water content of not greater than about 0.05%.

Embodiment 71. The method of embodiment 48, wherein the raw base polyol component comprises a pH of at least about 5.0 or at least about 5.1 or at least about 5.2 or at least about 5.3 or at least about 5.4 or at least about 5.5 or at least about 5.6 or at least about 5.7 or at least about 5.8 or at least about 5.9 or at least about 6.0.

Embodiment 72. The method of embodiment 48, wherein the raw base polyol component comprises a pH of not greater than about 8.0 or not greater than about 7.9 or not greater than about 7.8 or not greater than about 7.7 or not greater than about 7.6 or not greater than about 7.5 or not greater than about 7.4 or not greater than about 7.3 or not greater than about 7.2 or not greater than about 7.1 or not greater than about 7.0.

Embodiment 73. The method of embodiment 48, wherein the raw material mixture further comprises a raw melamine component and wherein the raw material mixture comprises a content of the raw melamine component of at least about 4.0 wt. % for a total weight of the raw material mixture or at least about 4.2 wt. % or at least about 4.5 wt. % or at least about 4.8 wt. % or at least about 5.0 wt. % or at least about 5.2 wt. % or at least about 5.5 wt. % or at least about 5.8 wt. % or at least about 6.0 wt. % or at least about 6.2 wt. % or at least about 6.5 wt. % or at least about 6.8 wt. % or at least about 7.0 wt. % or at least about 7.2 wt. % or at least about 7.5 wt. % or at least about 7.8 wt. % or at least about 8.0 wt. % or at least about 8.2 wt. % or at least about 8.5 wt. %.

Embodiment 74. The method of embodiment 48, wherein the raw material mixture further comprises a raw melamine component and wherein the raw material mixture comprises a content of the of the raw melamine component of not greater than about 13 wt. % for a total weight of the raw material mixture or not greater than about 12.8 wt. % or not greater than about 12.5 wt. % or not greater than about 12.2 wt. % or not greater than about 12.0 wt. % or not greater than about 11.8 wt. % or not greater than about 11.5 wt. % or not greater than about 11.2 wt. % or not greater than about 11.0 wt. % or not greater than about 10.8 wt. % or not greater than about 10.5 wt. % or not greater than about 10.2 wt. % or not greater than about 10.0 wt. % or not greater than about 9.8 wt. % or not greater than about 9.5 wt. %.

Embodiment 75. The method of embodiment 48, wherein the raw material mixture comprises a raw isocyanate component.

Embodiment 76. The method of embodiment 75, wherein the raw material mixture comprises a content of the raw isocyanate component of at least about 1 wt. % for a total weight of the raw material mixture or at least about 1.5 wt. % or at least about 2.0 wt. % or at least about 2.5 wt. % or at least about 3.0 wt. % or at least about 3.5 wt. % or at least about 4.0 wt. %.

Embodiment 77. The method of embodiment 76, wherein the raw material mixture comprises a content of the raw isocyanate component of not greater than about 9.0 wt. % for a total weight of the raw material mixture or not greater than about 8.5 wt. % or not greater than about 8.0 wt. % or not greater than about 7.5 wt. % or not greater than about 7.0 wt. % or not greater than about 6.5 wt. % or not greater than about 6.0 wt. % or not greater than about 5.5 wt. % or not greater than about 5.0 wt. %.

Embodiment 78. The method of embodiment 48, wherein the raw material mixture comprises a raw surfactant component.

Embodiment 79. The method of embodiment 78, wherein the raw material mixture comprises a content of the raw surfactant component of at least about 1 wt. % for a total weight of the raw material mixture or at least about 1.5 wt. % or at least about 2.0 wt. % or at least about 2.5 wt. % or at least about 3.0 wt. % or at least about 3.5 wt. % or at least about 4.0 wt. %.

Embodiment 80. The method of embodiment 79, wherein the raw material mixture comprises a content of the surfactant component of not greater than about 9.0 wt. % for a total weight of the raw material mixture or not greater than about 8.5 wt. % or not greater than about 8.0 wt. % or not greater than about 7.5 wt. % or not greater than about 7.0 wt. % or not greater than about 6.5 wt. % or not greater than about 6.0 wt. % or not greater than about 5.5 wt. % or not greater than about 5.0 wt. %.

Embodiment 81. The method of embodiment 48, wherein the raw material mixture comprises a raw catalyst component.

Embodiment 82. The method of embodiment 48, wherein the raw material mixture comprises a content of the raw catalyst component of at least about 0.1 wt. % for a total weight of the raw material mixture or at least about 0.25 wt. % or at least about 0.5 wt. % or at least about 0.75 wt. % or at least about 1.0 wt. % or at least about 1.25 wt. % or at least about 1.5 wt. %.

Embodiment 83. The method of embodiment 48, wherein the raw material mixture comprises a content of the raw catalyst component of not greater than about 5.0 wt. % for a total weight of the raw material mixture or not greater than about 4.75 wt. % or not greater than about 4.5 wt. % or not greater than about 4.25 wt. % or not greater than about 4.0 wt. % or not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or not greater than about 2.0 wt. %.

Embodiment 84. The method of embodiment 48, wherein the raw material mixture comprises a raw pigment component.

Embodiment 85. The method of embodiment 48, wherein the raw material mixture comprises a content of the raw pigment component of at least about 0.1 wt. % for a total weight of the raw material mixture or at least about 0.25 wt. % or at least about 0.5 wt. % or at least about 0.75 wt. % or at least about 1.0 wt. % or at least about 1.25 wt. % or at least about 1.5 wt. %.

Embodiment 86. The method of embodiment 48, wherein the raw material mixture comprises a content of the raw pigment component of not greater than about 5.0 wt. % for a total weight of the raw material mixture or not greater than about 4.75 wt. % or not greater than about 4.5 wt. % or not greater than about 4.25 wt. % or not greater than about 4.0 wt. % or not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or not greater than about 2.0 wt. %.

Embodiment 87. The method of embodiment 48, wherein the raw material mixture comprises a raw chain extender component.

Embodiment 88. The method of embodiment 48, wherein the raw material mixture comprises a content of the raw chain extender component of at least about 0.1 wt. % for a total weight of the raw material mixture or at least about 0.25 wt. % or at least about 0.5 wt. % or at least about 0.75 wt. % or at least about 1.0 wt. % or at least about 1.25 wt. % or at least about 1.5 wt. %.

Embodiment 89. The method of embodiment 48, wherein the raw material mixture comprises a content of the raw chain extender component of not greater than about 5.0 wt. % for a total weight of the raw material mixture or not greater than about 4.75 wt. % or not greater than about 4.5 wt. % or not greater than about 4.25 wt. % or not greater than about 4.0 wt. % or not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or not greater than about 2.0 wt. %.

Embodiment 90. The method of embodiment 48, wherein the raw material mixture comprises a raw thixotropic agent component.

Embodiment 91. The method of embodiment 48, wherein the raw material mixture comprises a content of the raw thixotropic agent component of at least about 0.1 wt. % for a total weight of the raw material mixture or at least about 0.25 wt. % or at least about 0.5 wt. % or at least about 0.75 wt. %.

Embodiment 92. The method of embodiment 48, wherein the raw material mixture comprises a content of the raw thixotropic agent component of not greater than about 4.0 wt. % for a total weight of the raw material mixture or not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or not greater than about 2.0 wt. % or not greater than about 1.75 wt. % or not greater than about 1.5 wt. % or not greater than about 1.25 wt. % or not greater than about 1.0 wt. %.

Embodiment 93. The method of embodiment 48, wherein providing the raw material mixture comprises: adding the raw phosphorous polyol component to the raw base polyol component to form a first mixture and stirring the first mixture to form a first homogeneous dispersion; adding the raw expandable graphite to the first homogeneous dispersion to form a second mixture and stirring the second mixture to form a second homogeneous dispersion; and adding the isocyanate to the second homogeneous dispersion to form a third homogeneous dispersion and stirring the third mixture to form the raw material mixture.

Embodiment 94. The method of embodiment 93, wherein forming the raw material mixture into a polyurethane foam comprises forming the raw material mixture to form a foamed material mixture.

Embodiment 95. The method of embodiment 94, wherein forming the raw material mixture into a polyurethane foam further comprises curing the formed material mixture to form the polyurethane foam.

Embodiment 96. The method of embodiment 48, wherein the polyurethane foam comprises: a base polyol component; a phosphorous polyol component; and an expandable graphite, wherein the polyurethane foam comprises a V0 rating based on a UL94 flame retardancy test performed at a polyurethane foam thickness of 3.5 mm and a polyurethane foam density of 380 kg/m$^3$.

Embodiment 97. The method of embodiment 96, wherein the phosphorous polyol component comprises at least one ethylene oxide (EO) terminal.

Embodiment 98. The method of embodiment 96, wherein phosphorous polyol component comprises an ethylene oxide content of not greater than about 30%.

Embodiment 99. The method of embodiment 96, wherein the phosphorous polyol component comprises an OH number of at least about 80 KOH mg/g or at least about 85 KOH mg/g or at least about 90 KOH mg/g or at least about 95 KOH mg/g or at least about 100 KOH mg/g or at least about 105 KOH mg/g or at least about 110 KOH mg/g or at least about 115 KOH mg/g or at least about 120 KOH mg/g or at least about 125 KOH mg/g.

Embodiment 100. The method of embodiment 96, wherein the phosphorous polyol component comprises an OH number of not greater than about 180 KOH mg/g or not greater than about 175 KOH mg/g or not greater than about 170 KOH mg/g or not greater than about 165 KOH mg/g or not greater than about 160 KOH mg/g or not greater than about 155 KOH mg/g or not greater than about 150 KOH mg/g or not greater than about 145 KOH mg/g or not greater than about 140 KOH mg/g or not greater than about 135 KOH mg/g.

Embodiment 101. The method of embodiment 96, wherein the phosphorous polyol component comprises a viscosity of at least about 1 Pa*s or at least about 1.1 Pa*s or at least about 1.2 Pa*s or at least about 1.3 Pa*s or at least about 1.4 Pa*s or at least about 1.5 Pa*s or at least about 1.6 Pa*s or at least about 1.7 Pa*s or at least about 1.8 Pa*s or at least about 1.9 Pa*s or at least about 2.0 Pa*s.

Embodiment 102. The method of embodiment 96, wherein the phosphorous polyol component comprises a viscosity of not greater than about 4 PA*s or not greater than about 3.9 PA*s or not greater than about 3.8 PA*s or not greater than about 3.7 PA*s or not greater than about 3.6 PA*s or not greater than about 3.5 PA*s or not greater than about 3.4 PA*s or not greater than about 3.3 PA*s or not greater than about 3.2 PA*s or not greater than about 3.1 PA*s or not greater than about 3.0 PA*s or not greater than about 2.9 PA*s or not greater than about 2.8 PA*s or not greater than about 2.7 PA*s or not greater than about 2.6 PA*s or not greater than about 2.5 PA*s or not greater than about 2.4 PA*s or not greater than about 2.3 PA*s or not greater than about 2.2 PA*s.

Embodiment 103. The method of embodiment 96, wherein the phosphorous polyol component comprises a molecular weight of at least about 700 or at least about 710 or at least about 720 or at least about 730 or at least about 740 or at least about 750 or at least about 760 or at least about 770 or at least about 780 or at least about 790 or at least about 800 or at least about 810 or at least about 820 or at least about 830 or at least about 840 or at least about 850 or at least about 860.

Embodiment 104. The method of embodiment 96, wherein the phosphorous polyol component comprises a molecular weight of not greater than about 920 or not greater than about 910 or not greater than about 900 or not greater than about 890 or not greater than about 880 or not greater than about 870.

Embodiment 105. The method of embodiment 96, wherein the phosphorous polyol component has a functionality of 2.

Embodiment 106. The method of embodiment 96, wherein the polyurethane foam comprises a content of phosphorous polyol component of at least about 8 wt. % for a total weight of the polyurethane foam or at least about 9 wt. % or at least about 10 wt. % or at least about 11 wt. % or at least about 12 wt. % or at least about 13 wt. % or at least about 14 wt. %.

Embodiment 107. The method of embodiment 96, wherein the polyurethane foam comprises a content of phosphorous polyol component of not greater than about 40 wt. % for a total weight of the polyurethane foam or not greater than about 38 wt. % or not greater than about 36 wt. % or not greater than about 34 wt. % or not greater than about 32 wt. % or not greater than about 31 wt. % or not greater than about 31 wt. % or not greater than about 30 wt. % or not greater than about 29 wt. % or not greater than about 28 wt. % or not greater than about 27 wt. % or not greater than about 26 wt. % or not greater than about 25 wt. % or not greater than about 24 wt. % or not greater than about 23 wt. % or not greater than about 22 wt. % or not greater than about 21 wt. % or not greater than about 20 wt. % or not greater than about 19 wt. % or not greater than about 18 wt. %.

Embodiment 108. The method of embodiment 96, wherein the polyurethane foam comprises a content of expandable graphite of at least about 8 wt. % for a total weight of the polyurethane foam or at least about 9 wt. % or at least about 10 wt. % or at least about 11 wt. % or at least about 12 wt. % or at least about 13 wt. % or at least about 14 wt. %.

Embodiment 109. The method of embodiment 96, wherein the polyurethane foam comprises a content of expandable graphite of not greater than about 40 wt. % for a total weight of the polyurethane foam or not greater than about 38 wt. % or not greater than about 36 wt. % or not greater than about 34 wt. % or not greater than about 32 wt. % or not greater than about 31 wt. % or not greater than about 31 wt. % or not greater than about 30 wt. % or not greater than about 29 wt. % or not greater than about 28 wt. % or not greater than about 27 wt. % or not greater than about 26 wt. % or not greater than about 25 wt. % or not greater than about 24 wt. % or not greater than about 23 wt. % or not greater than about 22 wt. % or not greater than about 21 wt. % or not greater than about 20 wt. % or not greater than about 19 wt. % or not greater than about 18 wt. %.

Embodiment 110. The method of embodiment 96, wherein the polyurethane foam comprises a content of base polyol component of at least about 20 wt. % for a total weight of the polyurethane foam or at least about 22 wt. % or at least about 24 wt. % or at least about 26 wt. % or at least about 28 wt. % or at least about 30 wt. % or at least about 32 wt. % or at least about 34 wt. % or at least about 36 wt. % or at least about 38 wt. % or at least about 40 wt. %.

Embodiment 111. The method of embodiment 96, wherein the polyurethane foam comprises a content of base polyol component of not greater than about 60 wt. % for a total weight of the polyurethane foam or not greater than about 58 wt. % or not greater than about 56 wt. % or not greater than about 54 wt. % or not greater than about 52 wt. % or not greater than about 50 wt. % or not greater than about 48 wt. % or not greater than about 46 wt. % or not greater than about 44 wt. % or not greater than about 42 wt. % or not greater than about 40 wt. % or not greater than about 38 wt. % or not greater than about 36 wt. %.

Embodiment 112. The method of embodiment 96, wherein the base polyol component comprises an APHA color measurement of not greater than about 50.

Embodiment 113. The method of embodiment 96, wherein the base polyol component comprises an OH number of at least about 52 KOH mg/g.

Embodiment 114. The method of embodiment 96, wherein the base polyol component comprises an OH number of not greater than about 56 KOH mg/g.

Embodiment 115. The method of embodiment 96, wherein the base polyol component comprises a viscosity of at least about 450 cps/25° C. or at least about 455 cps/25° C. or at least about 460 cps/25° C. or at least about 465 cps/25° C. or at least about 470 cps/25° C. or at least about 475 cps/25° C. or at least about 480 cps/25° C. or at least about 485 cps/25° C. or at least about 490 cps/25° C.

Embodiment 116. The method of embodiment 96, wherein the base polyol component comprises a viscosity of not greater than about 550 cps/25° C. or not greater than about 545 cps/25° C. or not greater than about 540 cps/25° C. or not greater than about 535 cps/25° C. or not greater than about 530 cps/25° C. or not greater than about 525 cps/25° C. or not greater than about 520 cps/25° C. or not greater than about 515 cps/25° C. or not greater than about 510 cps/25° C.

Embodiment 117. The method of embodiment 96, wherein the base polyol component comprises an acid number of not greater than about 0.1 KOH mg/g.

Embodiment 118. The method of embodiment 96, wherein the base polyol component comprises a water content of not greater than about 0.05%.

Embodiment 119. The method of embodiment 96, wherein the base polyol component comprises a pH of at least about 5.0 or at least about 5.1 or at least about 5.2 or at least about 5.3 or at least about 5.4 or at least about 5.5 or at least about 5.6 or at least about 5.7 or at least about 5.8 or at least about 5.9 or at least about 6.0.

Embodiment 120. The method of embodiment 96, wherein the base polyol component comprises a pH of not greater than about 8.0 or not greater than about 7.9 or not greater than about 7.8 or not greater than about 7.7 or not greater than about 7.6 or not greater than about 7.5 or not greater than about 7.4 or not greater than about 7.3 or not greater than about 7.2 or not greater than about 7.1 or not greater than about 7.0.

Embodiment 121. The method of embodiment 96, wherein the polyurethane foam comprises a content of the melamine cyanurate of at least about 4.0 wt. % for a total weight of the polyurethane foam or at least about 4.2 wt. % or at least about 4.5 wt. % or at least about 4.8 wt. % or at least about 5.0 wt. % or at least about 5.2 wt. % or at least about 5.5 wt. % or at least about 5.8 wt. % or at least about 6.0 wt. % or at least about 6.2 wt. % or at least about 6.5 wt. % or at least about 6.8 wt. % or at least about 7.0 wt. % or at least about 7.2 wt. % or at least about 7.5 wt. % or at least about 7.8 wt. % or at least about 8.0 wt. % or at least about 8.2 wt. % or at least about 8.5 wt. %.

Embodiment 122. The method of embodiment 96, wherein the polyurethane foam comprises a content of the of the melamine cyanurate of not greater than about 13 wt. % for a total weight of the polyurethane foam or not greater than about 12.8 wt. % or not greater than about 12.5 wt. % or not greater than about 12.2 wt. % or not greater than about 12.0 wt. % or not greater than about 11.8 wt. % or not greater than about 11.5 wt. % or not greater than about 11.2 wt. % or not greater than about 11.0 wt. % or not greater than about 10.8 wt. % or not greater than about 10.5 wt. % or not greater than about 10.2 wt. % or not greater than about 10.0 wt. % or not greater than about 9.8 wt. % or not greater than about 9.5 wt. %.

Embodiment 123. The method of embodiment 96, wherein the polyurethane foam comprises a surfactant.

Embodiment 124. The method of embodiment 123, wherein the polyurethane foam comprises a content of the surfactant of at least about 1 wt. % for a total weight of the polyurethane foam or at least about 1.5 wt. % or at least about 2.0 wt. % or at least about 2.5 wt. % or at least about 3.0 wt. % or at least about 3.5 wt. % or at least about 4.0 wt. %.

Embodiment 125. The method of embodiment 123, wherein the polyurethane foam comprises a content of the surfactant of not greater than about 9.0 wt. % for a total weight of the polyurethane foam or not greater than about 8.5 wt. % or not greater than about 8.0 wt. % or not greater than about 7.5 wt. % or not greater than about 7.0 wt. % or not greater than about 6.5 wt. % or not greater than about 6.0 wt. % or not greater than about 5.5 wt. % or not greater than about 5.0 wt. %.

Embodiment 126. The method of embodiment 96, wherein the polyurethane foam comprises a catalyst.

Embodiment 127. The method of embodiment 126, wherein the polyurethane foam comprises a content of the catalyst of at least about 0.1 wt. % for a total weight of the polyurethane foam or at least about 0.25 wt. % or at least about 0.5 wt. % or at least about 0.75 wt. % or at least about 1.0 wt. % or at least about 1.25 wt. % or at least about 1.5 wt. %.

Embodiment 128. The method of embodiment 126, wherein the polyurethane foam comprises a content of the catalyst of not greater than about 5.0 wt. % for a total weight of the polyurethane foam or not greater than about 4.75 wt. % or not greater than about 4.5 wt. % or not greater than about 4.25 wt. % or not greater than about 4.0 wt. % or not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or not greater than about 2.0 wt. %.

Embodiment 129. The method of embodiment 96, wherein the polyurethane foam comprises a pigment.

Embodiment 130. The method of embodiment 129, wherein the polyurethane foam comprises a content of the pigment of at least about 0.1 wt. % for a total weight of the polyurethane foam or at least about 0.25 wt. % or at least about 0.5 wt. % or at least about 0.75 wt. % or at least about 1.0 wt. % or at least about 1.25 wt. % or at least about 1.5 wt. %.

Embodiment 131. The method of embodiment 129, wherein the polyurethane foam comprises a content of the pigment of not greater than about 5.0 wt. % for a total weight of the polyurethane foam or not greater than about 4.75 wt. % or not greater than about 4.5 wt. % or not greater than about 4.25 wt. % or not greater than about 4.0 wt. % or not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or not greater than about 2.0 wt. %.

Embodiment 132. The method of embodiment 96, wherein the polyurethane foam comprises a chain extender.

Embodiment 133. The method of embodiment 132, wherein the polyurethane foam comprises a content of the chain extender of at least about 0.1 wt. % for a total weight of the polyurethane foam or at least about 0.25 wt. % or at least about 0.5 wt. % or at least about 0.75 wt. % or at least about 1.0 wt. % or at least about 1.25 wt. % or at least about 1.5 wt. %.

Embodiment 134. The method of embodiment 132, wherein the polyurethane foam comprises a content of the chain extender of not greater than about 5.0 wt. % for a total weight of the polyurethane foam or not greater than about 4.75 wt. % or not greater than about 4.5 wt. % or not greater than about 4.25 wt. % or not greater than about 4.0 wt. % or not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or not greater than about 2.0 wt. %.

Embodiment 135. The method of embodiment 96, wherein the polyurethane foam comprises a thixotropic agent.

Embodiment 136. The method of embodiment 135, wherein the polyurethane foam comprises a content of the thixotropic agent of at least about 0.1 wt. % for a total weight of the polyurethane foam or at least about 0.25 wt. % or at least about 0.5 wt. % or at least about 0.75 wt.

Embodiment 137. The method of embodiment 135, wherein the polyurethane foam comprises a content of the thixotropic agent of not greater than about 4.0 wt. % for a total weight of the polyurethane foam or not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or not greater than about 2.0 wt. % or not greater than about 1.75 wt. % or not greater than about 1.5 wt. % or not greater than about 1.25 wt. % or not greater than about 1.0 wt. %.

Embodiment 138. The method of embodiment 96, wherein the polyurethane foam comprises isocyanate.

Embodiment 139. The method of embodiment 138, wherein the polyurethane foam comprises a content of isocyanate of at least about 8 wt. % for a total weight of the polyurethane foam or at least about 9 wt. % or at least about 10 wt. % or at least about 11 wt. % or at least about 12 wt. % or at least about 13 wt. % or at least about 14 wt. % or at least about 15 wt. %.

Embodiment 140. The method of embodiment 138, wherein the polyurethane foam comprises a content of phosphorous polyol component of not greater than about 40 wt. % for a total weight of the polyurethane foam or not greater than about 38 wt. % or not greater than about 36 wt. % or not greater than about 34 wt. % or not greater than about 32 wt. % or not greater than about 31 wt. % or not greater than about 31 wt. % or not greater than about 30 wt. % or not greater than about 29 wt. % or not greater than about 28 wt. % or not greater than about 27 wt. % or not greater than about 26 wt. % or not greater than about 25 wt. % or not greater than about 24 wt. % or not greater than about 23 wt. % or not greater than about 22 wt. % or not greater than about 21 wt. % or not greater than about 20 wt. % or not greater than about 19 wt. % or not greater than about 18 wt. %.

Embodiment 141. The method of embodiment 96, wherein the polyurethane foam comprises a thickness of at least about 0.5 mm or at least about 0.55 mm or at least about 0.6 mm or at least about 0.65 mm or at least about 0.7 mm or at least about 0.75 mm.

Embodiment 142. The method of embodiment 141, wherein the polyurethane foam comprises a thickness of not greater than about 15 mm or not greater than about 14.5 mm or not greater than about 14.0 mm or not greater than about 13.5 mm or not greater than about 13.0 mm or not greater than about 12.5 mm or not greater than about 12.0 mm or not greater than about 11.5 mm or not greater than about 11.0 mm or not greater than about 10.5 mm or not greater than about 10.0 mm or not greater than about 9.5 mm or not greater than about 9.0 mm or not greater than about 8.5 mm or not greater than about 8.0 mm or not greater than about 7.5 mm or not greater than about 7.0 mm or not greater than about 6.5 mm or not greater than about 6.0 mm or not greater than about 5.5 mm or not greater than about 5.0 mm or not greater than about 4.5 mm or not greater than about 4.0 mm or not greater than about 3.5 mm or not greater than about 3.0 mm or not greater than about 2.5 mm or not greater than about 2.0 mm or not greater than about 1.5 mm or not greater than about 1.0 mm.

Embodiment 143. The method of embodiment 96, wherein the polyurethane foam comprises a compression force deflection (CFD) of at least about 5 KPa as measured at a 20% compression ratio.

Embodiment 144. The method of embodiment 96, wherein the polyurethane foam comprises a compression force deflection (CFD) of not greater than about 700 KPa as measured at a 70% compression ratio.

Embodiment 145. The method of embodiment 96, wherein the polyurethane foam comprises a compression set (C-set) of not greater than about 10% or not greater than about 9% or not greater than about 8% or not greater than about 7% or not greater than about 6% or not greater than about 5% or not greater than about 4% or not greater than about 3% or not greater than about 2% or not greater than about 1% or substantially no C-set.

Embodiment 146. A battery compression pad comprising a polyurethane foam, wherein the polyurethane foam comprising: a base polyol component; a phosphorous polyol component; an expandable graphite, wherein the polyurethane foam comprises a V0 rating based on a UL94 flame retardancy test performed at a polyurethane foam thickness of 3.5 mm and a polyurethane foam density of 380 kg/m$^3$.

Embodiment 147. The battery compression pad of embodiment 146, wherein the phosphorous polyol component comprises at least one ethylene oxide (EO) terminal.

Embodiment 148. The battery compression pad of embodiment 147, wherein phosphorous polyol component comprises an ethylene oxide content of not greater than about 30%.

Embodiment 149. The battery compression pad of embodiment 146, wherein the phosphorous polyol component comprises an OH number of at least about 80 KOH mg/g or at least about 85 KOH mg/g or at least about 90 KOH mg/g or at least about 95 KOH mg/g or at least about 100 KOH mg/g or at least about 105 KOH mg/g or at least about 110 KOH mg/g or at least about 115 KOH mg/g or at least about 120 KOH mg/g or at least about 125 KOH mg/g.

Embodiment 150. The battery compression pad of embodiment 146, wherein the phosphorous polyol component comprises an OH number of not greater than about 180 KOH mg/g or not greater than about 175 KOH mg/g or not greater than about 170 KOH mg/g or not greater than about 165 KOH mg/g or not greater than about 160 KOH mg/g or not greater than about 155 KOH mg/g or not greater than about 150 KOH mg/g or not greater than about 145 KOH mg/g or not greater than about 140 KOH mg/g or not greater than about 135 KOH mg/g.

Embodiment 151. The battery compression pad of embodiment 146, wherein the phosphorous polyol component comprises a viscosity of at least about 1 Pa*s or at least about 1.1 Pa*s or at least about 1.2 Pa*s or at least about 1.3 Pa*s or at least about 1.4 Pa*s or at least about 1.5 Pa*s or at least about 1.6 Pa*s or at least about 1.7 Pa*s or at least about 1.8 Pa*s or at least about 1.9 Pa*s or at least about 2.0 Pa*s.

Embodiment 152. The battery compression pad of embodiment 146, wherein the phosphorous polyol component comprises a viscosity of not greater than about 4 PA*s or not greater than about 3.9 PA*s or not greater than about 3.8 PA*s or not greater than about 3.7 PA*s or not greater than about 3.6 PA*s or not greater than about 3.5 PA*s or not greater than about 3.4 PA*s or not greater than about 3.3 PA*s or not greater than about 3.2 PA*s or not greater than about 3.1 PA*s or not greater than about 3.0 PA*s or not greater than about 2.9 PA*s or not greater than about 2.8 PA*s or not greater than about 2.7 PA*s or not greater than about 2.6 PA*s or not greater than about 2.5 PA*s or not greater than about 2.4 PA*s or not greater than about 2.3 PA*s or not greater than about 2.2 PA*s.

Embodiment 153. The battery compression pad of embodiment 146, wherein the phosphorous polyol component comprises a molecular weight of at least about 700 or at least about 710 or at least about 720 or at least about 730 or at least about 740 or at least about 750 or at least about 760 or at least about 770 or at least about 780 or at least about 790 or at least about 800 or at least about 810 or at least about 820 or at least about 830 or at least about 840 or at least about 850 or at least about 860.

Embodiment 154. The battery compression pad of embodiment 146, wherein the phosphorous polyol component comprises a molecular weight of not greater than about 920 or not greater than about 910 or not greater than about 900 or not greater than about 890 or not greater than about 880 or not greater than about 870.

Embodiment 155. The battery compression pad of embodiment 146, wherein the phosphorous polyol component has a functionality of 2.

Embodiment 156. The battery compression pad of embodiment 146, wherein the polyurethane foam comprises a content of phosphorous polyol component of at least about 8 wt. % for a total weight of the polyurethane foam or at least about 9 wt. % or at least about 10 wt. % or at least about 11 wt. % or at least about 12 wt. % or at least about 13 wt. % or at least about 14 wt. %.

Embodiment 157. The battery compression pad of embodiment 146, wherein the polyurethane foam comprises a content of phosphorous polyol component of not greater than about 40 wt. % for a total weight of the polyurethane foam or not greater than about 38 wt. % or not greater than about 36 wt. % or not greater than about 34 wt. % or not greater than about 32 wt. % or not greater than about 31 wt. % or not greater than about 31 wt. % or not greater than about 30 wt. % or not greater than about 29 wt. % or not greater than about 28 wt. % or not greater than about 27 wt. % or not greater than about 26 wt. % or not greater than about 25 wt. % or not greater than about 24 wt. % or not greater than about 23 wt. % or not greater than about 22 wt. % or not greater than about 21 wt. % or not greater than about 20 wt. % or not greater than about 19 wt. % or not greater than about 18 wt. %.

Embodiment 158. The battery compression pad of embodiment 146, wherein the polyurethane foam comprises a content of expandable graphite of at least about 8 wt. % for a total weight of the polyurethane foam or at least about 9 wt. % or at least about 10 wt. % or at least about 11 wt. % or at least about 12 wt. % or at least about 13 wt. % or at least about 14 wt. %.

Embodiment 159. The battery compression pad of embodiment 146, wherein the polyurethane foam comprises a content of expandable graphite of not greater than about 40 wt. % for a total weight of the polyurethane foam or not greater than about 38 wt. % or not greater than about 36 wt.

% or not greater than about 34 wt. % or not greater than about 32 wt. % or not greater than about 31 wt. % or not greater than about 31 wt. % or not greater than about 30 wt. % or not greater than about 29 wt. % or not greater than about 28 wt. % or not greater than about 27 wt. % or not greater than about 26 wt. % or not greater than about 25 wt. % or not greater than about 24 wt. % or not greater than about 23 wt. % or not greater than about 22 wt. % or not greater than about 21 wt. % or not greater than about 20 wt. % or not greater than about 19 wt. % or not greater than about 18 wt. %.

Embodiment 160. The battery compression pad of embodiment 146, wherein the polyurethane foam comprises a content of base polyol component of at least about 20 wt. % for a total weight of the polyurethane foam or at least about 22 wt. % or at least about 24 wt. % or at least about 26 wt. % or at least about 28 wt. % or at least about 30 wt. % or at least about 32 wt. % or at least about 34 wt. % or at least about 36 wt. % or at least about 38 wt. % or at least about 40 wt. %.

Embodiment 161. The battery compression pad of embodiment 146, wherein the polyurethane foam comprises a content of base polyol component of not greater than about 60 wt. % for a total weight of the polyurethane foam or not greater than about 58 wt. % or not greater than about 56 wt. % or not greater than about 54 wt. % or not greater than about 52 wt. % or not greater than about 50 wt. % or not greater than about 48 wt. % or not greater than about 46 wt. % or not greater than about 44 wt. % or not greater than about 42 wt. % or not greater than about 40 wt. % or not greater than about 38 wt. % or not greater than about 36 wt. %.

Embodiment 162. The battery compression pad of embodiment 146, wherein the base polyol component comprises an APHA color measurement of not greater than about 50.

Embodiment 163. The battery compression pad of embodiment 146, wherein the base polyol component comprises an OH number of at least about 52 KOH mg/g.

Embodiment 164. The battery compression pad of embodiment 146, wherein the base polyol component comprises an OH number of not greater than about 56 KOH mg/g.

Embodiment 165. The battery compression pad of embodiment 146, wherein the base polyol component comprises a viscosity of at least about 450 cps/25° C. or at least about 455 cps/25° C. or at least about 460 cps/25° C. or at least about 465 cps/25° C. or at least about 470 cps/25° C. or at least about 475 cps/25° C. or at least about 480 cps/25° C. or at least about 485 cps/25° C. or at least about 490 cps/25° C.

Embodiment 166. The battery compression pad of embodiment 146, wherein the base polyol component comprises a viscosity of not greater than about 550 cps/25° C. or not greater than about 545 cps/25° C. or not greater than about 540 cps/25° C. or not greater than about 535 cps/25° C. or not greater than about 530 cps/25° C. or not greater than about 525 cps/25° C. or not greater than about 520 cps/25° C. or not greater than about 515 cps/25° C. or not greater than about 510 cps/25° C.

Embodiment 167. The battery compression pad of embodiment 146, wherein the base polyol component comprises an acid number of not greater than about 0.1 KOH mg/g.

Embodiment 168. The battery compression pad of embodiment 146, wherein the base polyol component comprises a water content of not greater than about 0.05%.

Embodiment 169. The battery compression pad of embodiment 146, wherein the base polyol component comprises a pH of at least about 5.0 or at least about 5.1 or at least about 5.2 or at least about 5.3 or at least about 5.4 or at least about 5.5 or at least about 5.6 or at least about 5.7 or at least about 5.8 or at least about 5.9 or at least about 6.0.

Embodiment 170. The battery compression pad of embodiment 146, wherein the base polyol component comprises a pH of not greater than about 8.0 or not greater than about 7.9 or not greater than about 7.8 or not greater than about 7.7 or not greater than about 7.6 or not greater than about 7.5 or not greater than about 7.4 or not greater than about 7.3 or not greater than about 7.2 or not greater than about 7.1 or not greater than about 7.0.

Embodiment 171. The battery compression pad of embodiment 146, wherein the polyurethane foam comprises a content of the melamine cyanurate of at least about 4.0 wt. % for a total weight of the polyurethane foam or at least about 4.2 wt. % or at least about 4.5 wt. % or at least about 4.8 wt. % or at least about 5.0 wt. % or at least about 5.2 wt. % or at least about 5.5 wt. % or at least about 5.8 wt. % or at least about 6.0 wt. % or at least about 6.2 wt. % or at least about 6.5 wt. % or at least about 6.8 wt. % or at least about 7.0 wt. % or at least about 7.2 wt. % or at least about 7.5 wt. % or at least about 7.8 wt. % or at least about 8.0 wt. % or at least about 8.2 wt. % or at least about 8.5 wt. %.

Embodiment 172. The battery compression pad of embodiment 146, wherein the polyurethane foam comprises a content of the of the melamine cyanurate of not greater than about 13 wt. % for a total weight of the polyurethane foam or not greater than about 12.8 wt. % or not greater than about 12.5 wt. % or not greater than about 12.2 wt. % or not greater than about 12.0 wt. % or not greater than about 11.8 wt. % or not greater than about 11.5 wt. % or not greater than about 11.2 wt. % or not greater than about 11.0 wt. % or not greater than about 10.8 wt. % or not greater than about 10.5 wt. % or not greater than about 10.2 wt. % or not greater than about 10.0 wt. % or not greater than about 9.8 wt. % or not greater than about 9.5 wt. %.

Embodiment 173. The battery compression pad of embodiment 146, wherein the polyurethane foam comprises a surfactant.

Embodiment 174. The battery compression pad of embodiment 173, wherein the polyurethane foam comprises a content of the surfactant of at least about 1 wt. % for a total weight of the polyurethane foam or at least about 1.5 wt. % or at least about 2.0 wt. % or at least about 2.5 wt. % or at least about 3.0 wt. % or at least about 3.5 wt. % or at least about 4.0 wt. %.

Embodiment 175. The battery compression pad of embodiment 173, wherein the polyurethane foam comprises a content of the surfactant of not greater than about 9.0 wt. % for a total weight of the polyurethane foam or not greater than about 8.5 wt. % or not greater than about 8.0 wt. % or not greater than about 7.5 wt. % or not greater than about 7.0 wt. % or not greater than about 6.5 wt. % or not greater than about 6.0 wt. % or not greater than about 5.5 wt. % or not greater than about 5.0 wt. %.

Embodiment 176. The battery compression pad of embodiment 146, wherein the polyurethane foam comprises a catalyst.

Embodiment 177. The battery compression pad of embodiment 176, wherein the polyurethane foam comprises a content of the catalyst of at least about 0.1 wt. % for a total weight of the polyurethane foam or at least about 0.25 wt. % or at least about 0.5 wt. % or at least about 0.75 wt. % or at least about 1.0 wt. % or at least about 1.25 wt. % or at least about 1.5 wt. %.

Embodiment 178. The battery compression pad of embodiment 176, wherein the polyurethane foam comprises a content of the catalyst of not greater than about 5.0 wt. % for a total weight of the polyurethane foam or not greater than about 4.75 wt. % or not greater than about 4.5 wt. % or not greater than about 4.25 wt. % or not greater than about 4.0 wt. % or not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or not greater than about 2.0 wt. %.

Embodiment 179. The battery compression pad of embodiment 146, wherein the polyurethane foam comprises a pigment.

Embodiment 180. The battery compression pad of embodiment 179, wherein the polyurethane foam comprises a content of the pigment of at least about 0.1 wt. % for a total weight of the polyurethane foam or at least about 0.25 wt. % or at least about 0.5 wt. % or at least about 0.75 wt. % or at least about 1.0 wt. % or at least about 1.25 wt. % or at least about 1.5 wt. %.

Embodiment 181. The battery compression pad of embodiment 179, wherein the polyurethane foam comprises a content of the pigment of not greater than about 5.0 wt. % for a total weight of the polyurethane foam or not greater than about 4.75 wt. % or not greater than about 4.5 wt. % or not greater than about 4.25 wt. % or not greater than about 4.0 wt. % or not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or not greater than about 2.0 wt. %.

Embodiment 182. The battery compression pad of embodiment 146, wherein the polyurethane foam comprises a chain extender.

Embodiment 183. The battery compression pad of embodiment 182, wherein the polyurethane foam comprises a content of the chain extender of at least about 0.1 wt. % for a total weight of the polyurethane foam or at least about 0.25 wt. % or at least about 0.5 wt. % or at least about 0.75 wt. % or at least about 1.0 wt. % or at least about 1.25 wt. % or at least about 1.5 wt. %.

Embodiment 184. The battery compression pad of embodiment 182, wherein the polyurethane foam comprises a content of the chain extender of not greater than about 5.0 wt. % for a total weight of the polyurethane foam or not greater than about 4.75 wt. % or not greater than about 4.5 wt. % or not greater than about 4.25 wt. % or not greater than about 4.0 wt. % or not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or not greater than about 2.0 wt. %.

Embodiment 185. The battery compression pad of embodiment 146, wherein the polyurethane foam comprises a thixotropic agent.

Embodiment 186. The battery compression pad of embodiment 185, wherein the polyurethane foam comprises a content of the thixotropic agent of at least about 0.1 wt. % for a total weight of the polyurethane foam or at least about 0.25 wt. % or at least about 0.5 wt. % or at least about 0.75 wt. %.

Embodiment 187. The battery compression pad of embodiment 185, wherein the polyurethane foam comprises a content of the thixotropic agent of not greater than about 4.0 wt. % for a total weight of the polyurethane foam or not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or not greater than about 2.0 wt. % or not greater than about 1.75 wt. % or not greater than about 1.5 wt. % or not greater than about 1.25 wt. % or not greater than about 1.0 wt. %.

Embodiment 188. The battery compression pad of embodiment 146, wherein the polyurethane foam comprises a thickness of at least about 0.5 mm or at least about 0.55 mm or at least about 0.6 mm or at least about 0.65 mm or at least about 0.7 mm or at least about 0.75 mm.

Embodiment 189. The battery compression pad of embodiment 146, wherein the polyurethane foam comprises a thickness of not greater than about 15 mm or not greater than about 14.5 mm or not greater than about 14.0 mm or not greater than about 13.5 mm or not greater than about 13.0 mm or not greater than about 12.5 mm or not greater than about 12.0 mm or not greater than about 11.5 mm or not greater than about 11.0 mm or not greater than about 10.5 mm or not greater than about 10.0 mm or not greater than about 9.5 mm or not greater than about 9.0 mm or not greater than about 8.5 mm or not greater than about 8.0 mm or not greater than about 7.5 mm or not greater than about 7.0 mm or not greater than about 6.5 mm or not greater than about 6.0 mm or not greater than about 5.5 mm or not greater than about 5.0 mm or not greater than about 4.5 mm or not greater than about 4.0 mm or not greater than about 3.5 mm or not greater than about 3.0 mm or not greater than about 2.5 mm or not greater than about 2.0 mm or not greater than about 1.5 mm or not greater than about 1.0 mm.

Embodiment 190. The battery compression pad of embodiment 146, wherein the polyurethane foam comprises a compression force deflection (CFD) of at least about 5 KPa as measured at a 20% compression ratio.

Embodiment 191. The battery compression pad of embodiment 146, wherein the polyurethane foam comprises a compression force deflection (CFD) of not greater than about 700 KPa as measured at a 70% compression ratio.

Embodiment 192. The battery compression pad of embodiment 146, wherein the polyurethane foam comprises a compression set (C-set) of not greater than about 10% or not greater than about 9% or not greater than about 8% or not greater than about 7% or not greater than about 6% or not greater than about 5% or not greater than about 4% or not greater than about 3% or not greater than about 2% or not greater than about 1% or substantially no C-set.

EXAMPLES

The concepts described herein will be further described in the following Examples, which do not limit the scope of the invention described in the claims.

Example 1

Three sample polyurethane foams S1, S2 and S3 were formed according to embodiments described herein. The compositions of each sample polyurethane foam S1, S2 and S3 are summarized in Table 1 below.

TABLE 1

Sample Foam Composition

| Component | S1 (wt. % for a total weight of the sample) | S2 (wt. % for a total weight of the sample) | S3 (wt. % for a total weight of the sample) |
| --- | --- | --- | --- |
| Base polyol-1 | 37.79 | 40.97 | 43.69 |
| Surfactant | 3 | 5.15 | 5.49 |
| Catalyst | 2.04 | 1.78 | 1.89 |
| Pigment | 0.87 | 2.21 | 2.35 |
| Chain extender | 1.64 | 1.54 | 1.64 |
| Thixotropic agent | 1.42 | 0.82 | 0.81 |
| Phosphorous polyol | 15.11 | 12.29 | 13.11 |
| Melamine Cyanurate | 7.56 | 6.15 | — |
| Expandable graphite | 15.11 | 12.29 | 13.11 |
| Isocyanate | 15.45 | 16.80 | 17.91 |

Each of the sample polyurethane foams were formed by mixing all the liquid components (including the base polyol, surfactant, catalyst, pigment, chain extender, thixotropic agent, phosphorous polyol) until the liquid phase is homogeneous. Then, the fillers (including the melamine cyanurate, expandable graphite, zinc borate, phosphorous compound, phosphorous nitric compound) were added to the liquid mixture. The combined mixture was then mixed until it reached a homogeneous composition. Finally, the isocyanate was added to the combined mixture. The final mixture was cured in an over at 170° C. oven for several minutes.

Each of the sample polyurethane foams were tested to determine their UL94 fire retardancy rating at various polyurethane foam thicknesses and densities. The results of the tests are summarized in Table 2 below.

TABLE 2

UL94 Fire Retardancy Rating Test Results

| Foam Thickness (mm) | Foam Density (kg/m$^3$) | S1 | S2 | S3 |
| --- | --- | --- | --- | --- |
| 3.5 | 380 | V0 | V0 | V0 |
| 3.0 | 340 | V0 | V0 | — |
| 2.5 | 300 | V0 | — | — |
| 2.0 | 380 | V0 | — | — |
| 2.0 | 340 | V0 | | |
| 1.5 | 370 | V0 | | |

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A polyurethane foam comprising:
    a base polyol component;
    a phosphorous polyol component;
    an isocyanate at a content of at least about 1 wt. % and not greater than about 9.0 wt. % for a total weight of the polyurethane foam, and
    an expandable graphite at a content of at least about 8 wt. % and not greater than about 40 wt. % for a total weight of the polyurethane foam, wherein the phosphorous polyol component comprises at least one ethylene oxide (EO) terminal and an ethylene oxide content of not greater than about 30%, and
    wherein the polyurethane foam comprises a V0 rating based on a UL94 flame retardancy test performed at a polyurethane foam thickness of 3.5 mm and a polyurethane foam density of 380 kg/m$^3$.

2. The polyurethane foam of claim 1, wherein the phosphorous polyol component comprises an OH number of at least about 80 KOH mg/g and not greater than about 180 KOH mg/g.

3. The polyurethane foam of claim 1, wherein the polyurethane foam comprises a content of phosphorous polyol component of at least about 8 wt. % and not greater than about 40 wt. % for a total weight of the polyurethane foam.

4. The polyurethane foam of claim 1, wherein the polyurethane foam comprises a content of base polyol component of at least about 20 wt. % and not greater than about 60 wt. % for a total weight of the polyurethane foam.

5. The polyurethane foam of claim 1, wherein the polyurethane foam further comprises melamine cyanurate.

6. The polyurethane foam of claim 5, wherein the polyurethane foam comprises a content of the melamine cyanurate of at least about 4.0 wt. % and not greater than about 13.0 wt. % for a total weight of the polyurethane foam.

7. A method of forming a polyurethane foam comprising:
    providing a raw material mixture comprising:
        a raw base polyol component;
        a raw phosphorous polyol component;
        a raw isocyanate at a content of at least about 1 wt. % and not greater than about 9.0 wt. % for a total weight of the raw material mixture, and
        a raw expandable graphite component at a content of at least about 8 wt. % and not greater than about 40 wt. % for a total weight of the raw material mixture, and
    forming the raw material mixture into a polyurethane foam,
        wherein the phosphorous polyol component comprises at least one ethylene oxide (EO) terminal and an ethylene oxide content of not greater than about 30%, and
        wherein the polyurethane foam comprises a V0 rating based on a UL94 flame retardancy test at a polyurethane foam thickness of 3.5 mm and a polyurethane foam density of 380 kg/m$^3$.

8. The method of claim 7, wherein the raw material mixture comprises a content of the raw phosphorous polyol component of at least about 8 wt. % and not greater than about 40 wt. % for a total weight of the raw material mixture.

9. The method of claim 7, wherein the raw material mixture comprises a content of the raw base polyol component of at least about 20 wt. % and not greater than about 60 wt. % for a total weight of the raw material mixture.

10. The method of claim 7, wherein the raw material mixture further comprises a raw melamine component and wherein the raw material mixture comprises a content of the raw melamine component of at least about 4.0 wt. % and not greater than about 13.0 wt. % for a total weight of the raw material mixture.

11. A battery compression pad comprising a polyurethane foam, wherein the polyurethane foam comprising: a base polyol component; a phosphorous polyol component; an isocyanate at a content of at least about 1 wt. % and not greater than about 9.0 wt. % for a total weight of the polyurethane foam, and an expandable graphite at a content of at least about 8 wt. % and not greater than about 40 wt. % for a total weight of the polyurethane foam, wherein the phosphorous polyol component comprises at least one ethylene oxide (EO) terminal and an ethylene oxide content of not greater than about 30%, and wherein the polyurethane foam comprises a V0 rating based on a UL94 flame retardancy test performed at a polyurethane foam thickness of 3.5 mm and a polyurethane foam density of 380 kg/m$^3$.

12. The battery compression pad of claim 11, wherein the phosphorous polyol component comprises an OH number of at least about 80 KOH mg/g and no greater than about 180 KOH mg/g.

13. The battery compression pad of claim 11, wherein the polyurethane foam comprises a content of phosphorous polyol component of at least about 8 wt. % and not greater than about 40 wt. % for a total weight of the polyurethane foam.

* * * * *